United States Patent
Chung et al.

(10) Patent No.: US 11,709,593 B2
(45) Date of Patent: Jul. 25, 2023

(54) ELECTRONIC APPARATUS FOR PROVIDING A VIRTUAL KEYBOARD AND CONTROLLING METHOD THEREOF

(71) Applicant: SAMSUNG ELECTRONICS CO., LTD., Suwon-si (KR)

(72) Inventors: Wonsuk Chung, Suwon-si (KR); Sunghyun Park, Suwon-si (KR); Soonyong Cho, Suwon-si (KR); Jaehwan Kim, Suwon-si (KR); Jisup Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 16/925,489

(22) Filed: Jul. 10, 2020

(65) Prior Publication Data

US 2021/0081104 A1 Mar. 18, 2021

(30) Foreign Application Priority Data

Sep. 18, 2019 (KR) .................. 10-2019-0114836
Dec. 30, 2019 (KR) .................. 10-2019-0178667

(51) Int. Cl.
*G06F 3/04886* (2022.01)

(52) U.S. Cl.
CPC .................. *G06F 3/04886* (2013.01)

(58) Field of Classification Search
CPC .. G06F 3/04886; G06F 1/1686; G06F 3/0236; G06F 3/0304; G06F 3/0425; G06F 3/0426; G06V 10/82; G06V 40/28
See application file for complete search history.

(56) References Cited

U.S. PATENT DOCUMENTS

| 7,835,999 B2 | 11/2010 | Block |
| 8,300,023 B2 | 10/2012 | Forutanpour et al. |
(Continued)

FOREIGN PATENT DOCUMENTS

| EP | 2851779 A1 | 3/2015 |
| JP | 5931298 B2 | 6/2016 |
(Continued)

OTHER PUBLICATIONS

International Search Report (PCT/ISA/210), issued by International Searching Authority in corresponding International Application No. PCT/KR2020/009003, dated Oct. 13, 2020.
(Continued)

*Primary Examiner* — Daniel W Parcher
(74) *Attorney, Agent, or Firm* — Sughrue Mion, PLLC

(57) ABSTRACT

Disclosed are an electronic apparatus and a method of controlling the same. The electronic apparatus includes a camera, a display, a memory, and a processor configured to execute at least one instruction to: detect a plurality of fingers in a plurality of first image frames obtained through the camera and, in response to an identification that a pose of the plurality of detected fingers corresponds to a trigger pose, enter a character input mode, detect a first motion of a finger among the plurality of fingers in a plurality of second image frames obtained through in the character input mode, identify a key corresponding to the first motion, from among a plurality of keys mapped to the finger, based on a position of the finger by the first motion and a reference point set to the finger, and control the display to display information corresponding to the identified key.

16 Claims, 31 Drawing Sheets

(56) References Cited

U.S. PATENT DOCUMENTS

| | | | |
|---|---|---|---|
| 8,345,017 B1* | 1/2013 | Cho | G06F 3/04886 345/173 |
| 9,377,863 B2 | 6/2016 | Bychkov et al. | |
| 9,582,091 B2 | 2/2017 | Kim et al. | |
| 9,836,127 B2 | 12/2017 | Jung | |
| 9,880,629 B2 | 1/2018 | Moscarillo | |
| 10,635,161 B2 | 4/2020 | Clement et al. | |
| 2010/0323762 A1* | 12/2010 | Sindhu | G06F 1/1613 455/566 |
| 2011/0201387 A1* | 8/2011 | Paek | G06F 40/274 455/566 |
| 2012/0154313 A1* | 6/2012 | Au | G06F 3/04883 345/173 |
| 2013/0181897 A1* | 7/2013 | Izumi | G06F 3/011 345/156 |
| 2013/0265218 A1* | 10/2013 | Moscarillo | G06F 3/0416 345/156 |
| 2014/0028567 A1* | 1/2014 | Park | G06F 3/017 345/168 |
| 2014/0157161 A1* | 6/2014 | Hunt | G06F 3/04847 715/768 |
| 2014/0298266 A1* | 10/2014 | Lapp | G06F 3/04886 715/835 |
| 2014/0375539 A1 | 12/2014 | Gabara | |
| 2015/0054761 A1 | 2/2015 | Kim et al. | |
| 2015/0062006 A1* | 3/2015 | Karakotsios | G06F 3/042 345/156 |
| 2015/0186037 A1* | 7/2015 | Kanatani | G06F 3/04886 715/773 |
| 2015/0268730 A1* | 9/2015 | Walline | G06F 3/0393 345/168 |
| 2015/0324001 A1 | 11/2015 | Yanai et al. | |
| 2016/0018985 A1 | 1/2016 | Bennet et al. | |
| 2016/0034180 A1* | 2/2016 | Labbe | G06F 3/0484 345/173 |
| 2016/0283105 A1* | 9/2016 | Maloo | G06F 3/04883 |
| 2016/0313890 A1* | 10/2016 | Walline | G06F 3/011 |
| 2017/0003876 A1 | 1/2017 | Marsden | |
| 2017/0329460 A1 | 11/2017 | Bae et al. | |
| 2018/0075254 A1* | 3/2018 | Reid | G06F 40/205 |
| 2019/0107944 A1* | 4/2019 | Glass | G06F 3/04883 |

FOREIGN PATENT DOCUMENTS

| | | | |
|---|---|---|---|
| JP | 2016-122475 A | 7/2016 | |
| JP | 2018-522310 A | 8/2018 | |
| KR | 10-2010-0036259 A | 4/2010 | |
| KR | 10-1359090 B1 | 2/2014 | |
| KR | 10-2015-0022536 A | 3/2015 | |
| KR | 10-2015-0087664 A | 7/2015 | |
| KR | 10-1559424 B1 | 10/2015 | |
| KR | 10-1559502 B1 | 10/2015 | |
| KR | 10-2016-0011451 A | 2/2016 | |
| KR | 10-2016-0060385 A | 5/2016 | |
| KR | 10-1791366 B1 | 10/2017 | |
| KR | 10-1896947 B1 | 10/2018 | |
| KR | 10-2019-0022911 A | 3/2019 | |
| WO | 2012056864 A1 | 5/2012 | |
| WO | 2012075197 A2 | 6/2012 | |

OTHER PUBLICATIONS

Written Opinion (PCT/ISA/237) issued by the International Searching Authority in corresponding International Application No. PCT/KR2020/009003, dated Oct. 13, 2020.

European Search Report dated Aug. 29, 2022 by the European Patent Office for EP Patent Application No. 20864743.8.

* cited by examiner (a)

(b)

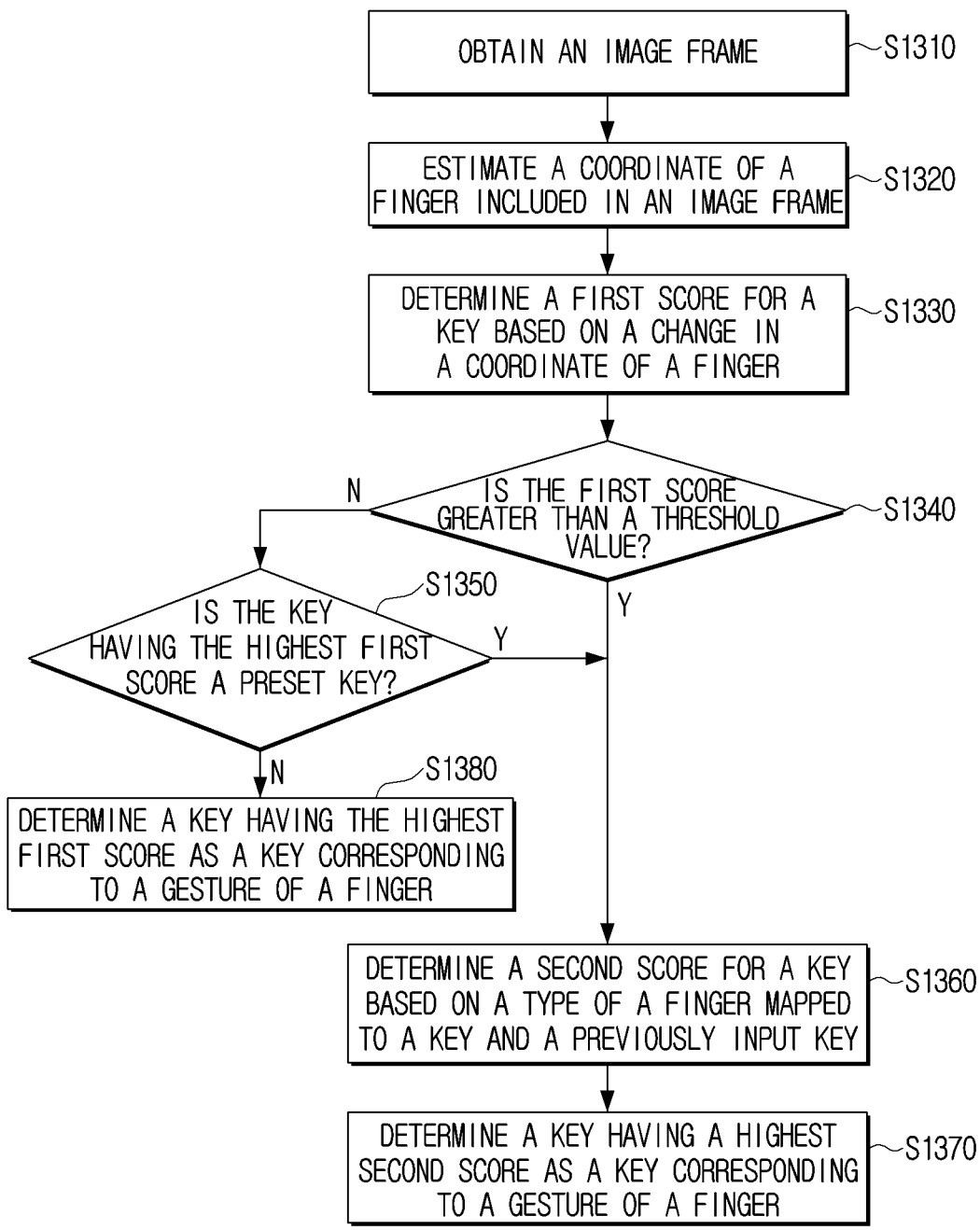

ELECTRONIC APPARATUS FOR PROVIDING A VIRTUAL KEYBOARD AND CONTROLLING METHOD THEREOF

CROSS-REFERENCE TO RELATED APPLICATION(S)

This application is based on and claims priority under 35 U.S.C. § 119 to Korean Patent Application No. 10-2019-0178667, filed on Dec. 30, 2019, and Korean Patent Application No. 10-2019-0114836, filed on Sep. 18, 2019, in the Korean Intellectual Property Office, the disclosures of which are incorporated by reference herein in their entireties.

BACKGROUND

1. Field

The disclosure relates to an electronic apparatus and a controlling method thereof and, more particularly, to an electronic apparatus providing a virtual interface and a controlling method thereof.

2. Description of Related Art

Development of technology has led to popularization of a camera incorporated into various electronic apparatuses, including a portable device.

In general, a portable device may input characters through an interface such as an on-screen keyboard, a portable physical keyboard, a voice keyboard, etc., and process works such as e-mail drafting, report creation, messenger chatting, content creation, or the like.

However, in the case of the on-screen keyboard, there is a high error rate resulting from the key-to-key interval or the size of the key being different according to the display size of the portable device. Further, there is a problem in that a user needs to type a key included in the keyboard while keeping eyes on the keyboard displayed on the display to input a correct key.

In one example, a portable physical keyboard is most advantageous in terms of recognition speed or accuracy rate, but there may be an inconvenience in that the physical keyboard must always be carried. Additionally, there may be problems in that the compatibility of the input port and the number of input ports is limited in the case of a wired keyboard, and a separate power source is required for the wireless keyboard.

In the example of a voice keyboard, a voice uttered by a user is recognized and the voice is converted to a text. However, there are problems in that there is a limitation in use such as a spatial limitation with respect to a public place and a limitation according to circumstances such as on-going conference, or the like. Further, the recognition speed or a recognition rate is low.

Accordingly, there is an increasing need for an interface that may accurately and quickly receive inputs through an existing portable device without using a separate physical device or replacing a device.

SUMMARY

Provided are an electronic apparatus providing a virtual interface and a controlling method thereof.

Additional aspects will be set forth in part in the description which follows and, in part, will be apparent from the description, or may be learned by practice of the presented embodiments.

In accordance with an aspect of the disclosure, an electronic apparatus includes: a camera; a display; a memory configured to store at least one instruction; and a processor configured to execute the at least one instruction to: detect a plurality of fingers in a plurality of first image frames obtained through the camera and, in response to an identification that a pose of the plurality of detected fingers corresponds to a trigger pose, enter a character input mode, detect a first motion of a finger among the plurality of fingers in a plurality of second image frames obtained through the camera in the character input mode, identify a key corresponding to the first motion, from among a plurality of keys mapped to the finger, based on a position of the finger by the first motion and a reference point set to the finger, control the display to display information corresponding to the identified key, and detect the plurality of fingers in a plurality of third image frames obtained through the camera in the character input mode and, in response to an identification that the pose of the plurality of detected fingers in the plurality of third image frames corresponds to a predetermined pose, re-set a reference point for respective fingers based on a position of the plurality of detected fingers in the plurality of third image frames.

In accordance with another aspect of the disclosure, a method of controlling an electronic apparatus includes: detecting a plurality of fingers in a plurality of first image frames obtained through a camera and, in response to an identification that a pose of the plurality of detected fingers corresponds to a trigger pose, entering a character input mode; detecting a first motion of a finger among the plurality of fingers in a plurality of second image frames obtained through the camera in the character input mode; identifying a key corresponding to the first motion, from among a plurality of keys mapped to the finger based on a position of the finger by the first motion and a reference point set to the finger; displaying information corresponding to the identified key on a display; and detecting the plurality of fingers in a plurality of third image frames obtained through the camera in the character input mode and, in response to an identification that the pose of the plurality of detected fingers corresponds to a predetermined pose, re-setting a reference point for respective fingers based on a position of the plurality of detected fingers in the plurality of third image frames.

In accordance with another aspect of the disclosure, a non-transitory computer-readable recording medium has recorded thereon at least one instruction executable by at least one processor to perform the method.

In accordance with another aspect of the disclosure, an electronic apparatus includes: a memory configured to store at least one instruction; and a processor configured to execute the at least one instruction to: detect a plurality of fingers in a plurality of first image frames and, in response to an identification that a pose of the plurality of detected fingers corresponds to a trigger pose, enter a character input mode, detect a first motion of a finger among the plurality of fingers in a plurality of second image frames obtained in the character input mode, identify a key corresponding to the first motion, from among a plurality of keys mapped to the finger, based on a position of the finger by the first motion and a reference point set to the finger, and control to output information corresponding to the identified key.

BRIEF DESCRIPTION OF THE DRAWINGS

The above and other aspects, features, and advantages of certain embodiments of the disclosure will be more apparent from the following description, taken in conjunction with the accompanying drawings, in which:

FIG. 13B is a flowchart illustrating a method for calibrating a typing error by an electronic apparatus according to an embodiment.

DETAILED DESCRIPTION

Figure 1:
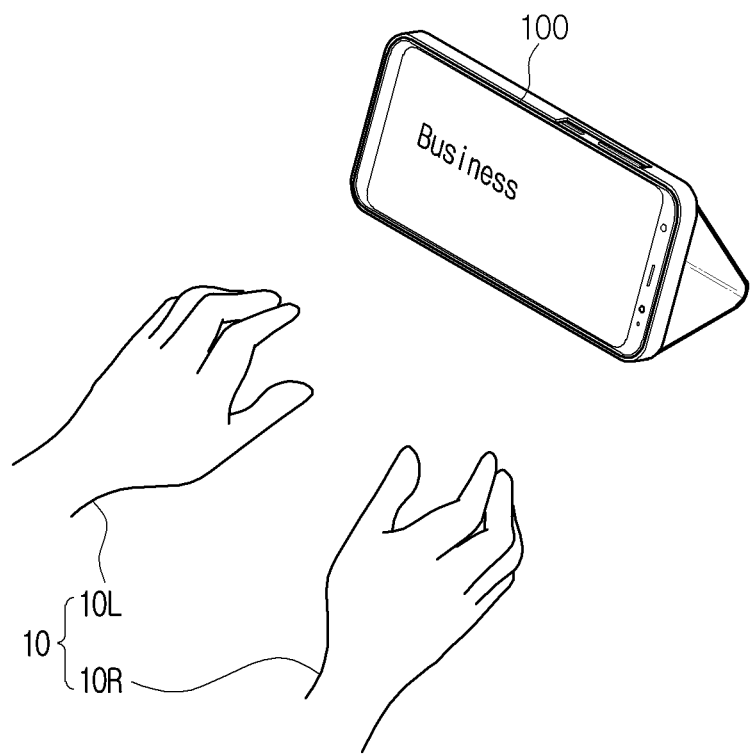
FIG. 1 is a diagram illustrating an electronic apparatus according to an embodiment.

Embodiments of the disclosure provide an electronic apparatus providing an interface capable of recognizing a user's motion as an input and a method of controlling the same.

In the following description of the disclosure, a detailed description of known functions and configurations may be omitted when it may obscure the subject matter of the disclosure. In addition, the following embodiments may be modified or combined (at least in parts) in many different forms, and the scope of the technical spirit of the disclosure is not limited to the following examples. Rather, these embodiments are provided so that this disclosure will be thorough and complete, and will fully convey the technical spirit to those skilled in the art.

However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements throughout.

Terms such as "first" and "second" used in various example embodiments may modify various elements regardless of an order and/or importance of the corresponding elements, and does not limit the corresponding elements. These terms may be used to distinguish one element from another.

In the description, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the other element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

FIG. 1 is a diagram illustrating an electronic apparatus 100 according to an embodiment.

Referring to FIG. 1, an electronic apparatus 100 may detect a user's hand 10 and provide an output corresponding to a motion of the user's hand 10. The electronic apparatus 100 may recognize a motion of the user's hand 10 by an input and provide an output corresponding to the input.

The electronic apparatus 100 may recognize a finger included in the user's hand 10. In this example, the electronic apparatus 100 may divide the user's hand 10 into the user's left hand 10L and the user's right hand 10R to recognize the fingers included in each of the left hand 10L and right hand 10R.

Here, a plurality of keys may be mapped to each finger of the user. The electronic apparatus 100 may determine (identify) a finger (hereinafter, a typing finger) that types a key among the plurality of fingers based on a motion (movement or gesture) of the user's hand 10 (or finger) typing the key, and determine one of the plurality of keys mapped to the typing finger based on the motion of the typing finger.

The motion of the hand 10 may refer to a movement of a finger for typing a specific key among a plurality of keys (e.g., character keys (a-z, etc.), numeric keys (0-9, etc.), and symbol keys (! @, #, etc.)) included in a virtual keyboard. The electronic apparatus 100 may identify the motion of the hand 10 based on the position (or change in position) of the finger.

The electronic apparatus 100 according to an embodiment may be implemented as a portable device. The portable device may refer to an electronic apparatus a general user may portably have, and may be implemented as at least one of smartphones, tablet PCs, mobile phones, video telephones, electronic book readers, desktop personal computers (PCs), laptop PCs, netbook computers, workstations, servers, a portable digital assistant (PDA), a portable multimedia player (PMP), an MP3 player, a medical device, a camera, or a wearable device. A wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit.

The electronic apparatus 100 according to an embodiment may be implemented as a home appliance. Home appliances generally refer to electronic apparatuses used in homes, but the appliances of the disclosure are not limited to specific places and may include electronic apparatuses used in various places such as offices, schools, hospitals, public offices, or the like. In an embodiment, the home appliance may be, for example, a television, a digital video disk (DVD) player, audio, refrigerator, cleaner, ovens, microwaves, washing machines, air purifiers, set top boxes, home automation control panels, security control panels, TV box (e.g., SAMSUNG HOMESYNC™, APPLE TV™, or GOOGLE TV™), game consoles (e.g., XBOX™, PLAYSTATION™), electronic dictionary, electronic key, camcorder, or electronic frame.

According to various embodiments, the electronic apparatus 100 may be implemented as a workstation, a server, an electronic board, an electronic signature receiving device, a projector, any of various measuring devices (e.g., water, electricity, gas, or electromagnetic wave measuring devices, or the like), a part of furniture or building/structure, or the like. In various embodiments, the electronic apparatus 100 may be one or more of the various devices described above. The electronic apparatus 100 according to an embodiment is not limited to the devices described above, and may include a new electronic apparatus according to technology development.

As described above, the electronic apparatus 100 may recognize the motion of a user as an input of the electronic apparatus 100. Thus, the electronic apparatus 100 can recognize the input accurately and quickly without using a separate physical device (e.g., a keyboard or the like) or replacing a device.

Figure 2A:
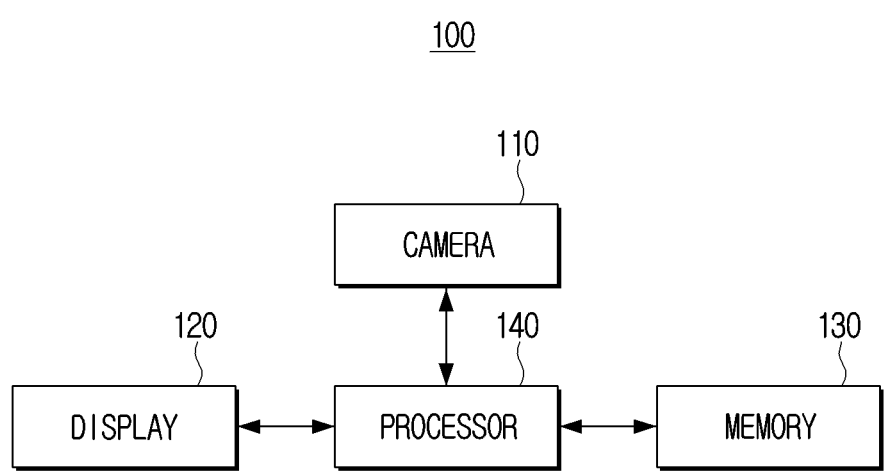
FIG. 2A is a block diagram illustrating a configuration of an electronic apparatus according to an embodiment.
Figure 2B:
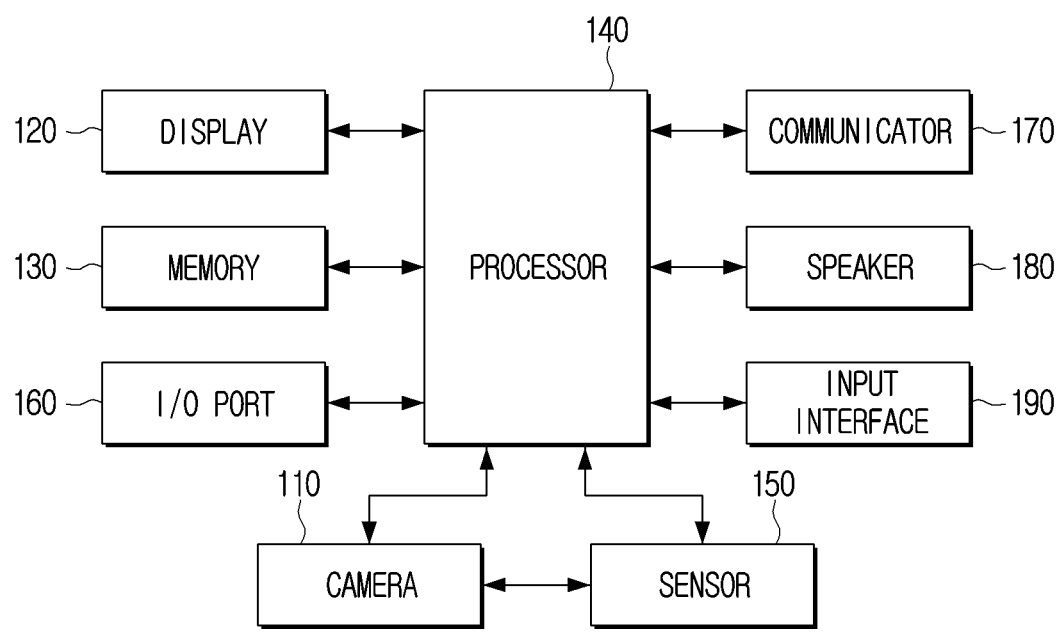
FIG. 2B is a block diagram illustrating an additional configuration of an electronic apparatus.

FIG. 2A is a block diagram illustrating a configuration of an electronic apparatus 100 according to an embodiment, and FIG. 2B is a block diagram illustrating an additional configuration of an electronic apparatus 100.

Referring to FIG. 2A, the electronic apparatus 100 according to an embodiment may include a camera 110, a display 120, a memory 130, and a processor 140.

The camera 110 may sequentially obtain a plurality of image frames by successively (or periodically) capturing an image of an object (e.g., one or both hands of the user) present in an imaging area. In this example, the number of frames of the plurality of image frames may represent time. For example, when the camera 110 obtains a plurality of image frames by photographing an object at a particular frame rate, a time may be obtained by multiplying the number of frames of the plurality of image frames by a frame rate (unit frames per second (FPS; fps), etc.). Each of the plurality of image frames may include information about a frame rate (e.g., 60 fps, 24 fps, etc.), a time point, or the like, of an image frame photographed by the camera 110. However, it is understood that this is just an example, and one or more other embodiment are not limited thereto. For example, information about a frame rate and a time point may be included in separate meta information (or metadata). The photographing area may mean an area for photographing through the lens, and may be a viewing angle. The viewing angle may be determined according to a focal length of the lens and a size (e.g., diagonal length) of an image sensor of the camera 110.

The camera 110 may be implemented as a red-green-blue (RGB) camera or a stereo camera.

The RGB camera may serially capture an object to sequentially obtain an image frame. The RGB camera may include a lens, an image sensor, and an image processor. The lens collects or separates the light reflected from the object with an image sensor, which divides the transmitted light into pixel units to generate an electrical signal by detecting red R, green G, blue B colors for each pixel. The image processor processes each pixel according to the electrical signal detected by the image sensor to obtain an image frame that represents the color of the object (e.g., the skin color of the hand or finger), the shape (e.g., the shape of the hand or finger), the contrast, or the like. In this example, a three-dimensional space of the reality is projected into a virtual two-dimensional plane, and each point constituting the image frame may include two-dimensional position information (e.g., an X-axis position, a Y-axis position). In this example, depth information (e.g., a Z-axis position) may be imparted to each of the points constituting the image frame through a programming library (e.g., an Open Business Computer Vision (OpenCV), a Python, or the like) to analyze shadow, contrast, point cloud, color, etc., of an image frame as a real-time computer vision, or various algorithm, wherein the image frame may include three-dimensional position information (e.g., X-axis position, Y-axis position, and Z-axis position).

A stereo camera may refer to a plurality of RGB cameras disposed apart from each other. A plurality of RGB cameras may simultaneously photograph an object at different positions (or directions) to obtain a plurality of image frames for the same time point. The processor 140 (or image processor) may stereo-match the plurality of image frames for the same time point to calculate disparity, and based on the parallax, the focal length of the lens, and the baseline, may calculate the depth (or distance) between the electronic apparatus 100 and the object (the object present in the space of reality). The processor 140 may combine the two-dimensional position information (e.g., the X-axis position, the Y-axis position) and the depth information (e.g., the Z-axis position) of the reference image frame of the plurality of image frames to obtain three-dimensional position information (e.g., an X-axis position, a Y-axis position, a Z-axis position) for the object included in the reference image frame. Here, stereo matching may refer to matching the same object included in a plurality of image frames for the same time point through a variety of methods, such as global matching, local matching, or the like. The parallax may refer to a position difference (e.g., a position difference on the x-axis or y-axis) for the same object included in the plurality of image frames, and the greater the focal length or baseline, the higher the parallax would be. The focal length may refer to the distance between the image sensor and the lens. The baseline may refer to an interval at which a plurality of RGB cameras are spaced apart from each other. The reference image frame may refer to an image frame photographed by a predetermined one of a plurality of RGB cameras.

The camera 110 may be implemented with an RGB-depth (RGB-D) camera. Here, the RGB-D camera may photograph an object to obtain an image frame, and may detect a depth (or distance) between the electronic apparatus 100 and the object (the object present in the space of reality). The processor 140 may combine the two-dimensional position information (e.g., the X-axis position, the Y-axis position) and the depth information (e.g., the Z-axis position) of the image frame to obtain three-dimensional position information (e.g., an X-axis position, a Y-axis position, a Z-axis position) for the object included in the image frame. The RGB-D camera may be implemented in such a way that the sensor 150 (see FIG. 2B) is physically coupled to the RGB camera or the stereo camera, or implemented such that the processor 140 combines the image frame obtained from the RGB camera or the stereo camera with the depth information obtained at the sensor.

The sensor 150 may detect a distance (or depth) with the object (e.g., the hand or finger of the user) or a motion of the object with reference to FIG. 2B. The sensor 150 may utilize various methods such as a structured light method, a time of flight (TOF) method, a motion capture method, or the like, and a hardware implemented according to the method may vary.

In the example of the structured light (SL), the sensor 150 may include a projector for emitting light having a pattern (e.g., a straight line or a dot repeated at a predetermined interval) toward the object, and a photodetector for detecting the reflection of light emitted by the object. The sensor 150 may recognize a distance or motion between the electronic apparatus 100 and the object by analyzing the modified pattern according to the appearance of the object (e.g., a user's hand or a finger, etc.). For the TOF method, the sensor 150 may include a generator that emits light or electromagnetic waves (e.g., laser, infrared, ultrasound, etc.) toward the object and a receiver that measures the time or intensity at which light or electromagnetic waves (e.g., laser, infrared, ultrasound, etc.) reflected by the object are returned. The sensor 150 may sense the distance between the electronic apparatus 100 and the object through the intensity or time at which light or propagation reflected by the object is returned. In the example of the motion capture method, a plurality of markers are attached to a user's body (e.g., a user's finger, a joint area, etc.), and the sensor 150 may detect the position of the plurality of markers and detect the motion of the user. In this example, various types of motion captures may be used, such as mechanical, magnetic, optical, inertial motion captures, or the like.

The camera 110 (or the sensor 150) may be included in the electronic apparatus 100, but this is merely exemplary. According to another embodiment, the camera 110 (or the sensor 150) may be provided in an external device separate from the electronic apparatus 100, wherein the electronic apparatus 100 may receive the image frame or depth information obtained from the external device via a communicator 170 (see FIG. 2B).

The display 120 is a device that visually outputs information or data. The display 120 may display an image frame in all or a portion of the display area. A display area may refer to the entire area in a pixel unit where information or data is visually displayed. At least a portion of the display 120 may be coupled to at least one of a front region and a side region and a back region of the electronic apparatus 100 in the form of a flexible display. The flexible display may be characterized as being bent, curved, or rolled without a damage through a paper-like thin and flexible substrate.

The memory 130 may refer to a hardware that stores information such as data as an electric or magnetic form so that the processor 140, or the like, may access, and the memory 130 may be implemented as at least one hardware among a non-volatile memory, a volatile memory, a flash memory, a hard disk drive (HDD) or solid state drive (SSD), random access memory (RAM), read-only memory (ROM), or the like.

The memory 130 may store at least one instruction, program, or data used for operation of the electronic apparatus 100 or the processor 140. The instruction is a code unit that directs the operation of the electronic apparatus 100 or the processor 140, and may be written in a machine language that can be understood by a computer. A program may be an instruction set of a series of instructions that perform a particular task of a task unit. The data may be status information in bit unit or byte unit that may represent characters, numbers, images, or the like.

The memory 130 may store an image frame obtained by the camera 110, information corresponding to a key identified by the processor 140, or the like. The memory 130 may be accessed by the processor 140, and reading/writing/modifying/updating of data by the processor 140 may be performed associated with the instructions, programs, or data.

The processor 140 may control the electronic apparatus 100 by executing at least one instruction stored in the memory 130. The processor 140 may be connected to the camera 110, the display 120, and the memory 130 to control the electronic apparatus 100. The processor 140 may read and interpret instructions and determine a sequence for data processing, and control the operation of other devices by providing, to other devices, timing and control signals that control the operation of other devices.

The processor 140 may control the electronic apparatus 100 by executing at least one instruction stored in a memory provided inside the processor 140. The memory provided inside the processor 140 may include ROM (e.g., NOR or NAND flash), RAM (e.g., dynamic RAM (DRAM), synchronous DRAM (SDRAM), double data rate SDRAM (DDR SDRAM)), volatile memory, or the like.

The processor 140 may be configured as one or a plurality of processors, and the processor 140 may be implemented as a general-use processor such as a central processing unit (CPU), an application processor (AP), a graphics-only processor such as a graphic processing unit (GPU), a vision processing unit (VPU), or the like, or an artificial intelligence (AI)-only processor such as a neural processing unit (NPU).

The processor 140 may include the GPU and the CPU, and the GPU and the CPU may perform the operations of an embodiment in association with each other. For example, the GPU may process image frames or the like in data, and the CPU may process the remaining data (e.g., instructions, code, etc.). In this example, the GPU is implemented with a structure having hundreds or thousands of cores specialized in a parallel processing method for processing various instructions or data at the same time, and the CPU may be implemented with a structure having several cores specialized in a serial processing method in which instructions or data are processed in an input order.

By way of one example, the GPU may detect a plurality of fingers in a plurality of first image frames obtained through the camera 110, the CPU may, in response to an identification that a pose of a plurality of detected fingers corresponds to a trigger pose, enter a character input mode, the GPU may detect a motion of one finger among a plurality of fingers in a plurality of second image frames obtained through the camera 110 in a character input mode, and the CPU may identify a key corresponding to a motion among a plurality of keys mapped to the finger based on a position of a finger by the motion and a position of a reference point set to the finger, and control the display 120 to display information corresponding to the identified key. This is only one example, and various alternative embodiments are possible. Below, it may be described that operations are performed by the processor 140, but this is for convenience of description and one or more other embodiments are not limited thereto.

The processor 140 may detect a plurality of fingers in a plurality of first image frames obtained through the camera 110, in response to (or based on) an identification that a pose of a plurality of detected fingers corresponds to a trigger pose, enter a character input mode, detect a motion of one finger among a plurality of fingers in a plurality of second frames obtained through the camera 110 in the character input mode, identify a key corresponding to the motion of the plurality of keys mapped to the finger based on the position of the finger by the motion and the position of the reference point set to the finger, and control the display 120 to display information corresponding to the identified key. In this example, the processor 140 may detect a plurality of fingers in a plurality of third image frames obtained through the camera 110 in the character input mode, and in response to an identification that the pose of the plurality of detected fingers corresponds to a predetermined pose, may re-set a reference point for each finger based on the position of the plurality of detected fingers. A detailed description is described below with reference to FIG. 7, or the like.

The character input mode may refer to a state in which the electronic apparatus 100 detects a motion (or gesture) of a user's finger, identifies a key corresponding to a motion (or a gesture) of a user's finger, and displays information corresponding to the identified key. That is, when the character input mode is entered, the motion of the user's finger is recognized as the input of a specific key, and when the character input mode is released, the motion of the user's finger is not recognized as the input of a specific key.

The motion of the finger may refer to a state in which the finger moves from a specific position to another position. The position of the finger by the motion may refer to a position to which the finger is moved when the finger moves from a specific position to another position.

The reference point set in the finger may refer to a position that is a criterion for determining the motion of the finger. If the pose of the finger is identified as corresponding to the trigger pose, the reference point may be set, and if the pose of the finger is identified as corresponding to the predetermined pose, the reference point may be reset so that the position of the reference point may be dynamically changed.

In response to an identification that a pose of a plurality of fingers detected in the plurality of first image frames corresponds to a trigger pose, the processor 140 may set a reference point for each finger based on the position of the plurality of detected fingers. This is further described below with reference to FIGS. 8A to 8C.

The terms such as a plurality of first image frames, a plurality of second image frames, a plurality of third image frames, and a plurality of fourth image frames described herein are intended to distinguish a plurality of different image frames, and are numbered according to order. This represents the order obtained over time, and between these image frames, there may be other image frames obtained through the camera 110.

For this purpose, based on a predetermined user command being input, the processor 140 may activate the camera 110 and obtain a plurality of first image frames via the activated camera 110. The predetermined user command may include a user command to display a document capable of inputting a text on the display 120 or a user command to select a text input window displayed on the display 120. A detailed description is described below with reference to FIGS. 4A and 4B.

Based on identification that a plurality of fingers detected in the plurality of first image frames correspond to a trigger pose, the processor 140 may display a virtual keyboard on the display 120. This is further described below with reference to FIG. 5C.

The plurality of keys may include a reference key determined based on a type of the hand including a finger and a type of fingers among the keys included in a virtual keyboard and at least two keys adjacent to the reference key among the keys included in the virtual keyboard. This is described in detail below with reference to FIG. 6B.

The processor 140, based on a key corresponding to a motion being identified in a character input mode, may display an identified key among the keys included in a virtual keyboard to be distinguished from other keys. This is described in detail below with reference to FIG. 6C.

If the key corresponding to the motion is a delete key for deleting the information displayed on the display 120, the processor 140 may delete the information displayed on the display 120 and adjust the transparency of the virtual keyboard based on the frequency of deleting the information. This is described in detail below with reference to FIG. 6D.

The processor 140 may detect a plurality of fingers in a plurality of third image frames obtained through the camera 110 in the character input mode. If the pose of the plurality of fingers detected in the plurality of third image frames is identified as corresponding to the predetermined pose, the processor 140 may reset the reference point for each finger based on the detected position of the plurality of fingers. The processor 140 may reset a reference point for each finger based on the detected position of the plurality of fingers when (or based on) the plurality of fingers detected in the plurality of third image frames are identified as maintaining the predetermined pose for a predetermined period of time. The processor 140 may identify whether the pose of the detected plurality of fingers corresponds to a predetermined pose based on the position of the fingertip of the remaining finger except the thumb among the plurality of fingers detected in the plurality of third image frames. The is described in detail below with reference to FIGS. 9A-9D.

If the distance between the position of the finger by the motion and the position of the reference point set in the finger is less than a predetermined value, the processor 140 may identify the reference key among the plurality of keys mapped to the finger as a key corresponding to the motion. Further, if the distance between the position of the finger by the motion and the position of the reference point set in the finger is equal to or greater than a predetermined value, the processor 140 may identify the key located in the direction in which the finger is moved from the reference key among the plurality of keys mapped to the finger based on the direction in which the finger is moved by the motion as a key corresponding to the motion. This is described in detail below with reference to FIGS. 10A and 10B.

If the motion of one finger of the plurality of fingers is detected in the plurality of fourth image frames obtained through the camera 110 after the reference point is reset in the character input mode, the processor 140 may identify a key corresponding to the motion among the plurality of keys mapped to the finger based on the position of the finger by the motion and the position of the reference point reset to the finger. In this example, when the motion of one finger of the plurality of fingers is detected in the plurality of second image frames, a description of the operation of identifying a key corresponding to the motion among the plurality of keys mapped to the finger based on the position of the finger by the motion and the position of the reference point set in the finger may be applied in the same manner. When (or based on) the motion of one finger among the plurality of fingers is detected in the plurality of second image frames, the position of the finger by the motion and the position of the reference point set to the finger may be replaced with the position of the finger by the motion of one of the plurality of fingers in the fourth image frame and the position of the reference point reset to the finger, based on the position of the finger by the motion and the position of the reference point set to the finger.

Referring to FIG. 2B, the electronic apparatus 100 may include the camera 110, the display 120, the memory 130, the processor 140, a sensor 150, an input/output (I/O) port 160, a communicator 170, a speaker 180, and an input interface 190. The camera 110, the display 120, the memory 140, and the sensor 150 have been described above and described redundant description thereof may not be provided below.

The I/O port 160 is configured to connect the electronic apparatus 100 and an external device by wire so that the electronic apparatus 100 may transmit or receive signals associated with an image and/or voice with an external device. For this purpose, the I/O port 160 may be implemented with a wired port such as a high definition multimedia interface (HDMI) port, a display port, an RGB port, a digital visual interface (DVI) port, a Thunderbolt bolt, and a component port. In one example, the electronic apparatus 100 may receive a signal associated with an image and/or voice from an external device via the I/O port 160, such that the electronic apparatus 100 may output an image and/or voice. As another example, the electronic apparatus 100 may transmit a signal associated with a specific image and/or voice to the external device through the I/O port 160 so that an external device may output an image and/or voice. As such, signals associated with an image and/or voice may be transmitted in one direction through the input/output port 160. However, this is merely exemplary, and the signal associated with an image and/or voice may be transmitted bi-directionally through the input/output port 160 in one or more other embodiments.

The communicator 170 may communicate with various types of external devices according to various types of communication methods to transmit and receive various types of data. The communicator 170 may include at least one of a Bluetooth chip, a Wi-Fi chip, a wireless communication chip, and a near field communication (NFC) chip for performing wireless communication, and an Ethernet module, and a universal serial bus (USB) module for performing wired communication. In this example, the Ethernet module and the USB module performing wired communication may communicate with an external device through the I/O port 160.

The speaker 180 may directly output various notification sound or voice messages as well as various audio data for which various processing has been performed, such as decoding or amplification, noise filtering, etc., by an audio processor as voice, and may be implemented in a form embedded in the electronic apparatus 100 or a separate external device. When the speaker 180 is implemented as an external device, the electronic apparatus 100 may transmit data for outputting sound to the speaker 180 connected through the I/O port 160 or the communicator 170. Here, the speaker 180 may be implemented as a directional speaker that transmits sound for only a specific location or area.

The input interface 190 may receive various user inputs and pass the same to the processor 140. The input interface 190 may include, for example, at least one of a touch panel, a pen sensor, a key, or a microphone. The touch panel may be used in relation to, for example, at least one of an electrostatic, a pressure-sensitive, infrared, or ultrasonic manner, and the touch panel may include a control circuit. The touch panel may further include a tactile layer to provide a tactile response to the user. The pen sensor may, for example, be part of a touch panel or include a separate recognition sheet. The key may include, for example, a physical button, an optical key, or a keypad. The microphone may receive the user's voice directly, and may digitally convert the user's voice, which is an analog signal, by a digital converter to obtain an audio signal. The input interface 190 may be embedded in the electronic apparatus 100 or may be implemented as a separate external device such as a keyboard, a mouse, an external microphone, or the like.

When the input interface 190 is implemented as an external device, the electronic apparatus 100 may receive a user input or an audio signal from the input interface 190 connected through the I/O port 160 or the communicator 170.

Hereinbelow, details of the disclosure are described with reference to the drawings.

Figure 3:
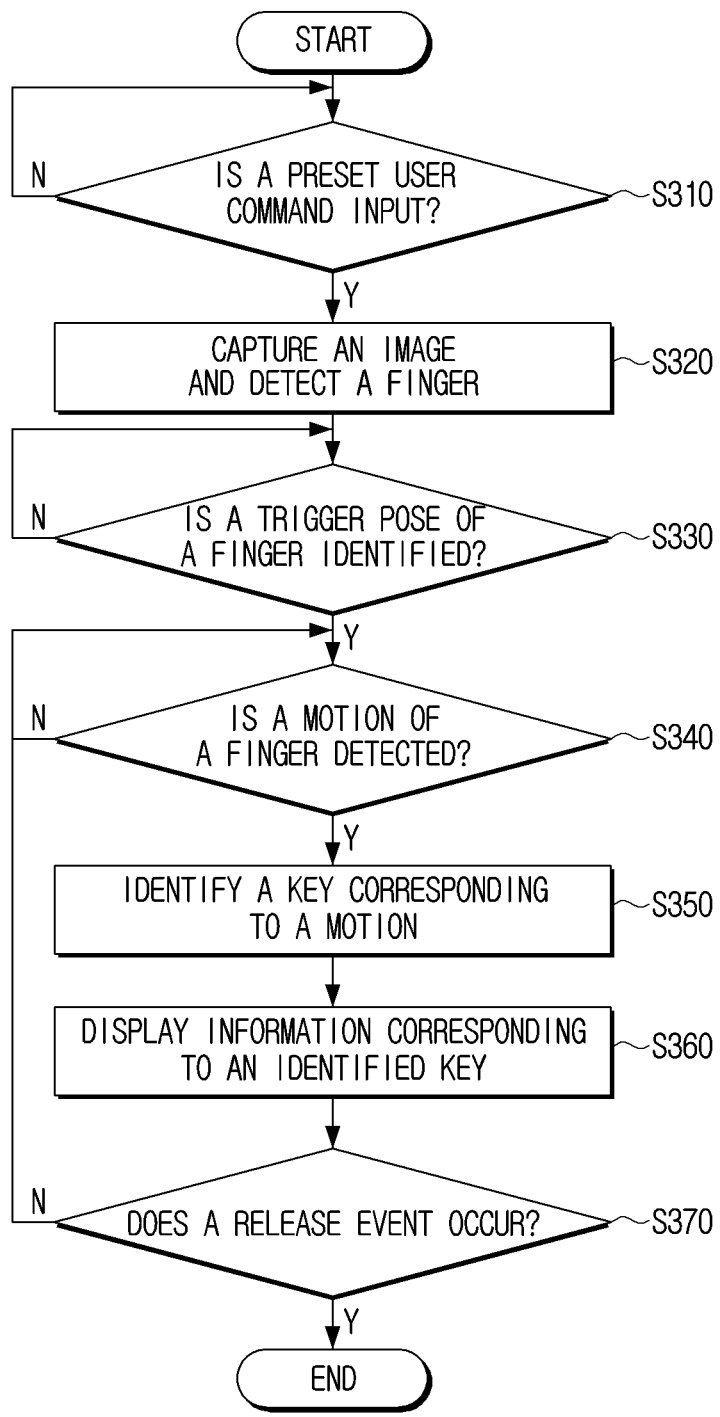
FIG. 3 is a flowchart illustrating an operation of an electronic apparatus according to an embodiment.

FIG. 3 is a flowchart illustrating an operation of an electronic apparatus 100 according to an embodiment.

Referring to FIG. 3, the electronic apparatus 100 may identify whether a predetermined user command is input in operation S310. Here, when a predetermined user command is identified as being input in operation S310—Y, the electronic apparatus 100 may obtain a plurality of image frames (e.g., a plurality of first image frames) through photographing (or image capturing) and may detect a plurality of fingers in each of the obtained image frames (e.g., the plurality of first image frames) in operation S320.

The electronic apparatus 100 may identify whether the plurality of fingers detected from the plurality of first image frames correspond to the trigger pose (i.e., a predetermined pose or positioning of the plurality of fingers) in operation S330.

If the plurality of fingers detected in the plurality of first image frames are identified as corresponding to the trigger pose in operation S330—Y, the character input mode may be entered. The electronic apparatus 100 may detect motion of the plurality of fingers in a plurality of second image frames obtained thereafter in operation S340.

If the plurality of fingers detected in the plurality of first image frames are identified as not corresponding to the trigger pose in operation S330—N, the electronic apparatus 100 may identify whether the plurality of fingers detected in the plurality of image frames obtained after the plurality of first image frames correspond to the trigger pose in operation S330.

If the motion of the plurality of fingers is detected in the plurality of second image frames obtained after the plurality of first image frames in operation S340—Y, the electronic apparatus 100 may identify a key corresponding to the motion in operation S350. In this example, the electronic apparatus 100 may display information corresponding to the identified key in operation S360. If the motion of the plurality of fingers is not detected in the plurality of second image frames in operation S340—N, the electronic apparatus 100 may detect the motion of the plurality of fingers in the plurality of image frames obtained after the second plurality of image frames in operation S340.

The electronic apparatus 100 may identify whether a release event (e.g., predetermined release event) has occurred in operation S370. If it is identified that a release event has occurred in operation S370—Y, the electronic apparatus 100 may release the character input mode. That is, the operation of detecting the motion of the finger to identify a key corresponding to the motion may be terminated. The release event may include an event in which an application (e.g., the application for which the inputs are being made) is terminated, an event in which the user's hand is not detected for a predetermined time (e.g., 15 seconds, 30 seconds, one minute, etc.), or the like. Alternatively, if the electronic apparatus 100 does not identify that a release event has not occurred in operation S370—N, the electronic apparatus 100 may repeat the operation S340 of detecting the motion of the plurality of fingers in the plurality of obtained image frames.

As the electronic apparatus 100 may recognize a motion of a finger as an input of a specific key based on (e.g., based only on) a trigger pose being detected, an operation to detect a user's motion in a situation where the user does not intend to input a key through a motion may be prevented thereby providing power savings and improving a user experience.

With reference to the drawings, details of the operations of FIG. 3 are described below.

Figure 4A:
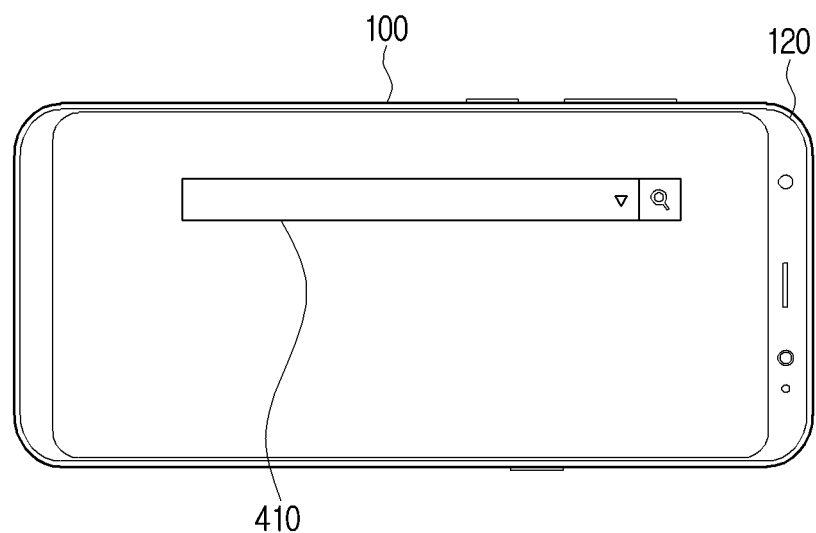
FIG. 4A is a diagram illustrating a preset user command according to an embodiment.
Figure 4B:
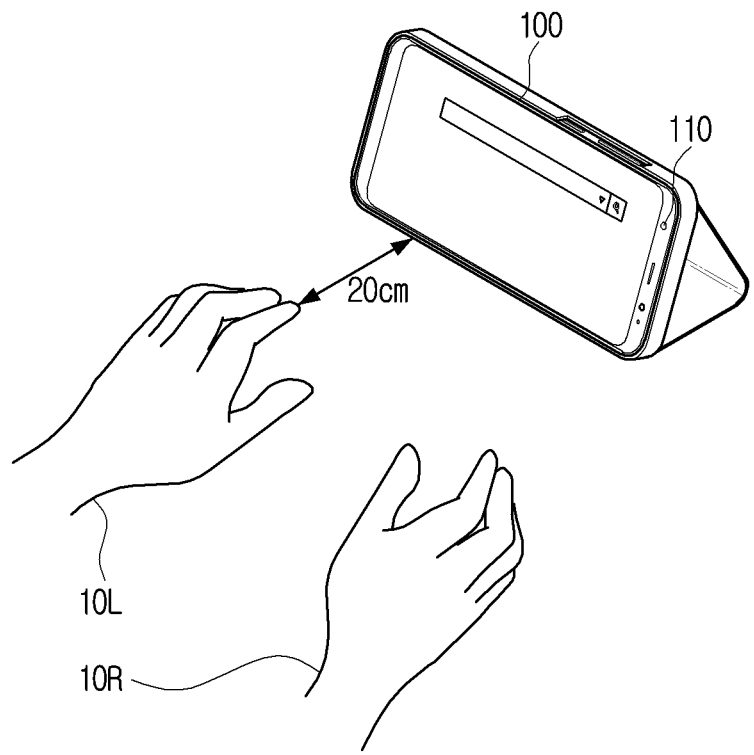
FIG. 4B is a diagram illustrating activation of a camera according to an embodiment.

Referring to FIGS. 4A and 4B, when (or based on) a predetermined user command is input in operation S310—Y, the processor 140 may activate the camera 110.

The predetermined user command may include a user command for selecting a text input window 410 displayed on the display 120 as illustrated in FIG. 4A or a user command for displaying the document capable of text input on the display 120. The text input window 410 is a field in which text, such as characters, numbers, symbols, etc., may be input or deleted, and the input text may be displayed in the text input window 410 of the display 120. Documents capable of inputting a text may include various forms of documents, such as e-mail, word processing documents, notes, scheduler document or interface, calendar, web pages, or the like. The user command may also be implemented in a variety of input ways, such as a user's touch, a user's voice, a user's gesture, selection of a physical button, a mouse click, or the like.

Activation of the camera 110 may refer to a state in which the camera 110 is driven to photograph or capture a photographing area.

For example, if a user command for selecting the text input window 410 displayed on the display 120 of the electronic apparatus 100 is input, as illustrated in FIG. 4A, the processor 140 may activate the camera 110 to control the camera 110 to serially photograph the user's hands 10L and 10R present (or positioned) within the photographing area, as illustrated in FIG. 4B. In FIG. 4B, the distance between the electronic apparatus 100 and the user's hand 10L and 10R is 20 cm, but this is intended to indicate that the user's hand 10L, 10R is within the photographing area, and is not limited thereto.

Figure 4C:
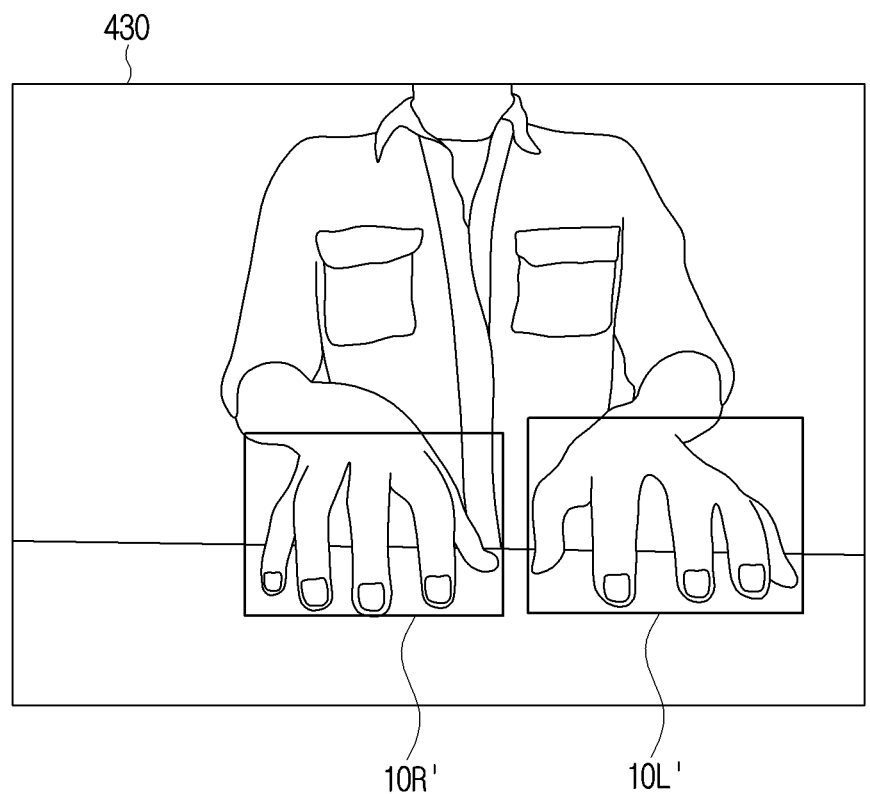
FIG. 4C is a diagram illustrating a method for detecting a finger from an image frame according an embodiment.

Referring to FIGS. 4B and 4C, the processor 140 may photograph the user's hand 10L, 10R present (or positioned) in a photographing area to obtain a plurality of image frames 430. The plurality of image frames 430 may include the user's hand 10L' and 10R'.

In the image frame 430 obtained through the camera 110, left and right may be inverted. This is because when the camera 110 photographs the left hand 10L of the user, as illustrated in FIG. 4C, the left hand 10L' of the user in the image frame 430 obtained through the camera 110 is positioned on the right side of the camera 110. However, this is merely exemplary, and it is also possible to process the image frame such that the left and right of the image frame are not inverted, such as a mirror. For convenience, it is assumed that the left and right are inverted in the image frame 430 obtained through the camera 110, but it is understood that one or more other embodiments are not limited thereto.

The processor 140 may detect a plurality of fingers in each of the plurality of obtained image frames in operation S320 to confirm the presence (or position) of the user's hand 10L, 10R within the photographing area of the camera 110 or within the sensing area of the sensor 150. The detection of a plurality of fingers in an image frame may be applicable to other image frames described in this disclosure in the same manner.

Referring to FIG. 4C, the processor 140 may detect a user's hand 10L', 10R' (or finger) from at least one object included in the image frame 430. In this example, programming libraries for analyzing real-time computer vision (e.g., OpenCV, Python, etc.), various color filters such as Sobel filter or Fuzzy filter, and various algorithms such as canny edge detection, color-based, template-based, and background differentiation methods may be used.

For example, the processor 140 may perform a preprocessing to binarize the color of a plurality of pixels included in the image frame 430, bundle (or group) adjacent pixels having similar colors based on the binarized color (or contrast) of each pixel to identify the pixels as objects, and detect an object having a rate and a curvature similar to the hand (or finger) of the identified object as the user's hand 10L', 10R' (or finger). It is understood that this is merely exemplary, and one or more other embodiments may be modified in various ways.

If the user's hand 10L', 10R' (or finger) is not detected in the image frame 430, the processor 140 may provide notification information to inform the user that the user's hand 10L', 10R' is not in a detectable state. The notification information may be provided in a form such as visual information (for example, text, images, or the like), sound information (for example, voice, sound, alarm sound, or the like), and tactile information (for example, a vibration or the like).

Figure 4D:
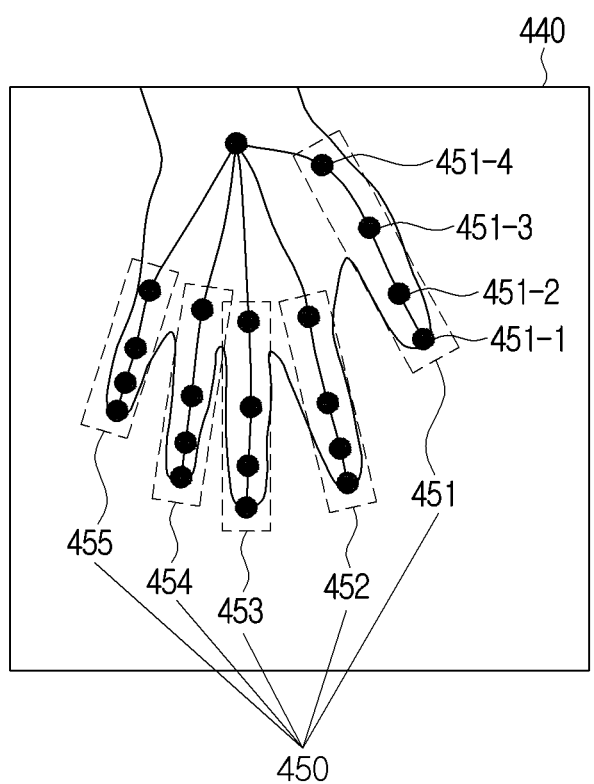
FIG. 4D is a diagram illustrating a method for detecting a finger from an image frame according to an embodiment.

With reference to FIGS. 4C and 4D, when (or based on) the user's hand 10L', 10R' is detected in the image frame 430, the processor 140 may identify a plurality of keypoints 450 from the user's hand(s) 10L', 10R'.

The plurality of keypoints 450 may refer to points for identifying (or recognizing) a position (or motion) of the user's hand in the image frame 430.

For example, the plurality of keypoints 450 may refer to a point corresponding to a fingertip or at least one joint of the user's finger. The plurality of keypoints 450 may include information about the type of finger (e.g., thumb to little finger or the left hand or right hand) and may be grouped according to the type of finger. In this example, the plurality of keypoints 450 may include a plurality of first keypoints 451 for the thumb grouped according to the type of finger, a plurality of second keypoints 452 for the index finger, a plurality of third keypoints 453 for the middle finger, a plurality of fourth keypoints 454 for the ring finger, and a plurality of fifth keypoints 455 for the little finger. Here, the plurality of first keypoints 451 for the thumb may include a keypoint 451-1 for the fingertip of the thumb, a keypoint 451-2 for the first joint of the thumb, a keypoint 451-3 for the second joint of the thumb, and a keypoint 451-4 for the third joint of the thumb. For a keypoint for another finger, it may include a keypoint for the fingertip of the finger and at least one joint of the finger in the same manner.

When the user's hands 10L' and 10R' are detected in the image frame 430, the processor 140 may identify a plurality of keypoints 450 from the plurality of the user's hands 10L' and 10R' based on the skeletal information of the finger. In this example, the skeletal information of the finger may include the length (or ratio) of the finger and the position of the joint of the finger, and the skeletal information of the finger may be pre-stored in the memory 130. Alternatively, the processor 140 may identify a plurality of keypoints 450 in a user's hand 10L', 10R' through a programming library (e.g., OpenCV, Python, etc.) for analyzing real-time computer vision or various algorithms.

Figure 4E:
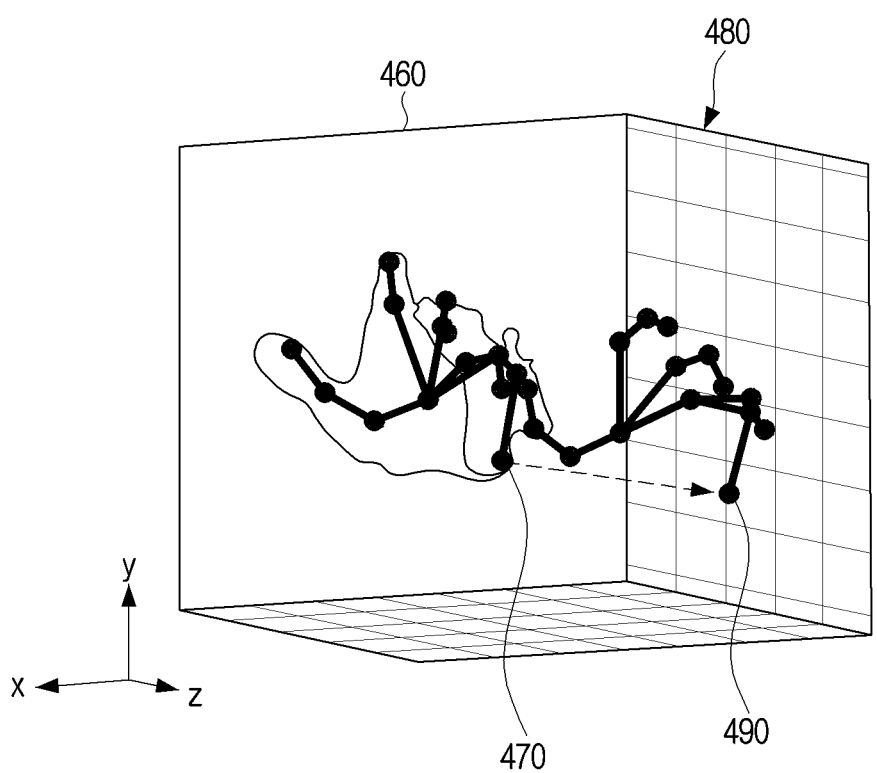
FIG. 4E is a diagram illustrating a method for detecting a finger from an image frame according to an embodiment.

As illustrated in FIG. 4E, the processor 140 may combine the position information (e.g., x, y) of the plurality of keypoints 470 identified in the image frame 460 with the depth information (e.g., Z) of the plurality of keypoints 470 and map the plurality of keypoints 470 to a three-dimensional space 480. Accordingly, a plurality of keypoints 490 mapped on the three-dimensional space 480 may include three-dimensional position information (e.g., x, y, z). Here, the position information may include a position of a horizontal axis (e.g., an x-axis) in an image frame 460 and a position on a longitudinal axis (e.g., y-axis) in the image frame 460. The position information may include a landscape position (e.g., x) and a portrait position (e.g., y) on the image frame 460 that may appear in a two-dimensional plane. The depth information includes a position on an axis that represents a depth (or distance) between the electronic apparatus 100 and an object (e.g., the user's hand 10L, 10R). For example, the depth information may be a position (e.g., z) on an axis (e.g., a z-axis perpendicular to the x-axis and the y-axis) that is perpendicular to the image frame 460. It is understood that this is merely exemplary, and various alternative embodiments are possible.

In this example, the plurality of keypoints 490 may correspond to the user's hand (or finger), and may include information about the type of finger (e.g., thumb to little finger of the left hand or right hand) and position information (e.g., P (x, y, z)). The processor 140 may generate a skeleton representing the shape (or motion) of a hand (or finger) by connecting a plurality of keypoints 490 to keypoints of each finger. In this example, the processor 140 may determine the bending degree of the finger through an angle between the keypoints connected to each other in the skeleton, and may determine the position of the finger through the position of the plurality of keypoints.

Referring to FIGS. 4C to 4E, the processor 140 may identify a region 440, 460 in which the user's hand 10L', 10R' is detected in the image frame 430 as a region of interest (ROI). The processor 140 may identify the plurality of keypoints 450, 470 in the region of interest 440, 460.

Accordingly, the processor 140 may identify (or recognize) the position (and/or motion) of the user's finger based on the position (and/or position change) of the plurality of keypoints 490. For example, the processor 140 may identify a position of a keypoint for a finger (e.g. a thumb or a little finger) included in the plurality of keypoints 490 to a position of the fingertip of the finger or the position of the joint relative to the user's finger (e.g., thumb or little finger).

The processor 140 may identify the distance between the user's finger and the electronic apparatus 100, depending on the angle between the interconnected keypoints among the plurality of keypoints. If (or based on) the angle between the keypoints connected to each other among the plurality of keypoints is large (if the bending degree of the finger is low), the processor 140 may identify that the distance between the user's finger and the electronic apparatus 100 is close, and if the angle between the keypoints connected to each other among the plurality of keypoints is small (if the bending degree of the finger is large), the processor 140 may identify that the distance between the user's finger and the electronic apparatus 100 is far.

Figure 5A:
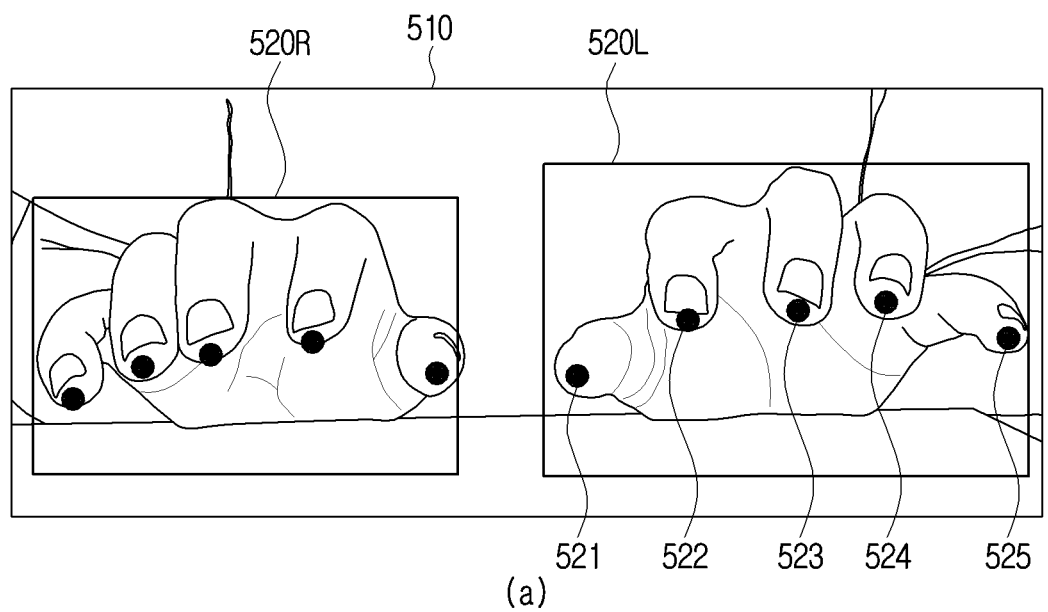
FIG. 5A is a diagram illustrating a trigger pose according to an embodiment.
Figure 5A:
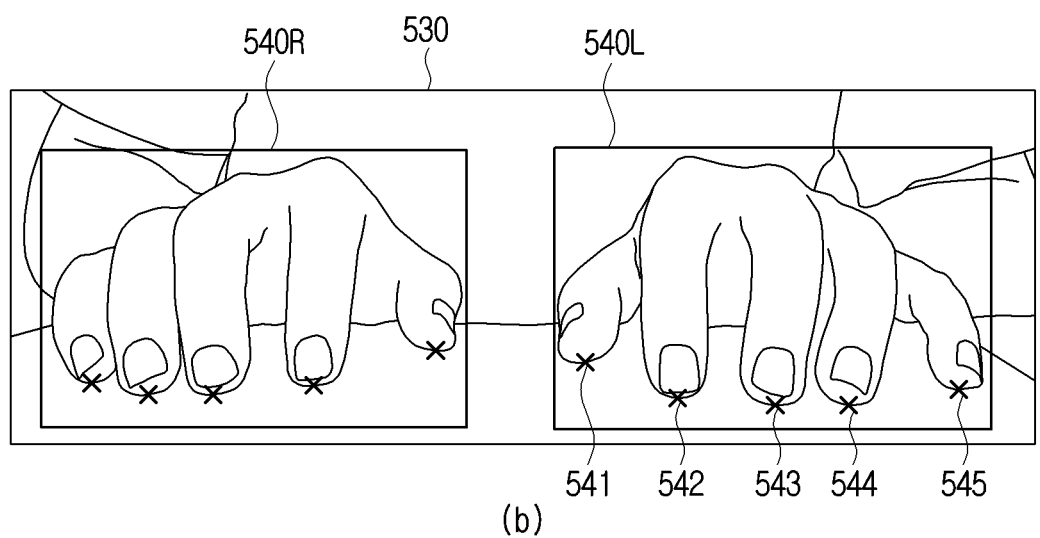
Figure 5B:
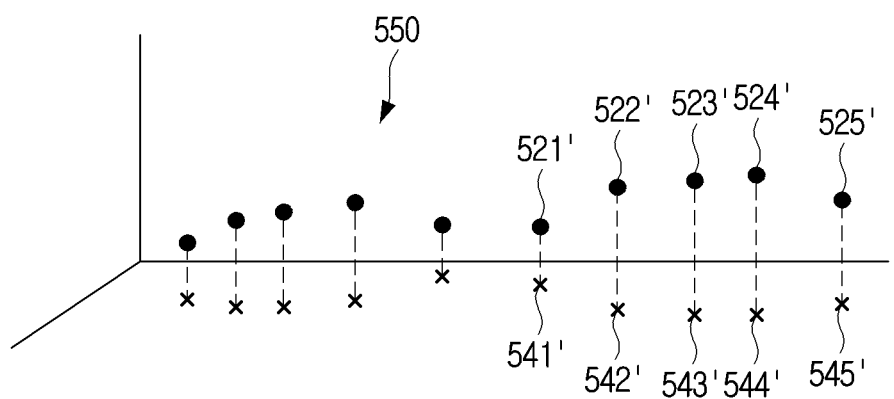
FIG. 5B is a diagram illustrating a method for identifying a trigger pose according to an embodiment.
Figure 5B:
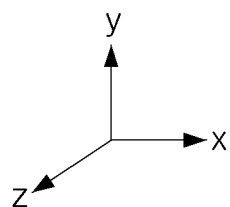

FIGS. 5A to 5B are diagrams illustrating a trigger pose according to an embodiment.

Referring to FIGS. 3 and 5A, the processor 140 may identify whether the plurality of fingers detected in the plurality of image frames 510, 530 correspond to the trigger pose in operation S330. The plurality of image frames 510, 530 may be the plurality of first image frames obtained before the plurality of second image frames.

The processor 140 may identify whether the plurality of fingers identified according to the position (or the degree of rotation of the joint) of each keypoint detected from the plurality of image frames 510, 530 correspond to the trigger pose.

This is to start (or prepare) an operation of detecting motion of a finger when (or based on) it is detected that a plurality of fingers of a user is positioned in a trigger pose (or initial pose) in a plurality of image frames. The trigger pose may be set to a specific pose of the plurality of fingers. The trigger pose may be added, modified or deleted by the user after the trigger pose is set initially, and may be set differently for each user.

For example, the trigger pose may be set such that, as illustrated in FIG. 5A(a), a first state where fingertips 521-522 of the finger of a left hand 520L and a right hand 520R of the user are apart from a specific plane by a first predetermined distance (or height) or more (e.g., 1 cm or more from the bottom), is changed to a second state where fingertips 541 to 545 of the hand of a left hand 540L and a right hand 540R of the user are apart from a specific plane by less than a second predetermined distance (e.g., the height of the finger is greater than or equal to 0 and less than 0.2 cm from the bottom). It is understood, however, that this is merely exemplary, and one or more other embodiments may be variously modified. Here, an example in which the height of the finger is 0 on the basis of the bottom surface may mean that the finger is placed on a bottom or the finger is in contact with the bottom surface.

Referring to FIG. 5B, the processor 140 may identify the fingertips 521 to 525 of the plurality of fingers detected in the plurality of image frames 510 as the keypoints 521' to 525' on a three-dimensional space plane 550, as illustrated in FIG. 5A(a). The processor 140 may identify the fingertips 541 to 545 of the plurality of fingers detected in the plurality of image frames 530 as the keypoints 541' to 545' on a three-dimensional space plane 550, as illustrated in FIG. 5A(b).

The processor 140 may identify the distance that the keypoints on the three-dimensional space plane 550 are spaced apart. The plane may be an xz plane (e.g., xz plane when y is 0, or the like), and the distance at which the keypoints are spaced apart may refer to the distance (or height) between the keypoint and the xz plane.

It is understood, however, that this is merely exemplary and various modifications may be made. For example, the processor 140 may determine a similarity between the pose of the plurality of fingers identified according to the position (or degree of rotation of the joint) of each keypoint and the degree of similarity between the trigger poses, and identify that the plurality of fingers correspond to the trigger pose, if the similarity is greater than or equal to a predetermined value (if the pose is the same or similar to a particular pose).

Hereinbelow, it will be assumed that the plurality of fingers detected in the plurality of image frames (a plurality of first image frames) 510, 530 correspond to the trigger poise in operation S330—Y.

According to an embodiment, if the plurality of fingers detected from the plurality of first image frames 510, 530 are identified as corresponding to the trigger pose, the processor 140 may display a virtual keyboard on the display 120. This is to visually provide an arrangement of keys for user's input to induce an accurate motion of the user.

Figure 5C:
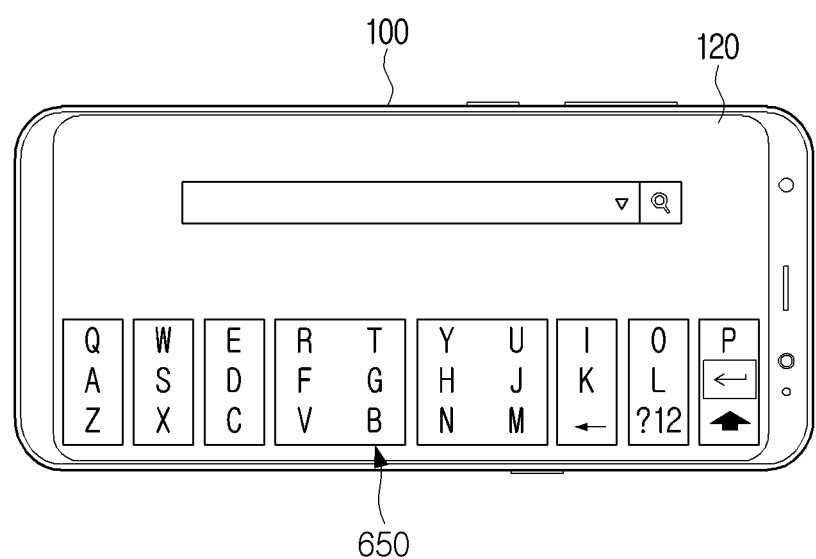
FIG. 5C is a diagram illustrating a use interface (UI) provided when a trigger pose is identified according to an embodiment.

For example, referring to FIG. 5C, the processor 140 may control the display 120 such that the virtual keyboard 650 is displayed. The virtual keyboard 650 may be a keyboard having an array of keys mapped to fingers, but is not limited thereto and may be a keyboard having a variety of keyboard arrays such as a QWERTY keyboard, a Chunjiin keyboard, a MoAKey keyboard, etc., and the processor 140 may change a keyboard array of the virtual keyboard 650 according to a user's input through the input interface 190.

The processor 140 may control the display 120 such that the virtual keyboard 650 is displayed at various positions such as a lower portion, a middle portion, and an upper portion of the display 120, and a position where the virtual keyboard 650 is displayed may be changed according to a user's input through the input interface 190.

According to another embodiment, the processor 140 may control the display 120 to indicate notification information if the plurality of fingers detected in the plurality of first image frames 510, 530 are identified as corresponding to the trigger pose. This is to provide the user with notification information to inform the user that the trigger pose is identified and the user's motion is being detected, so as to induce the motion of the user to enter the key.

Figure 5D:
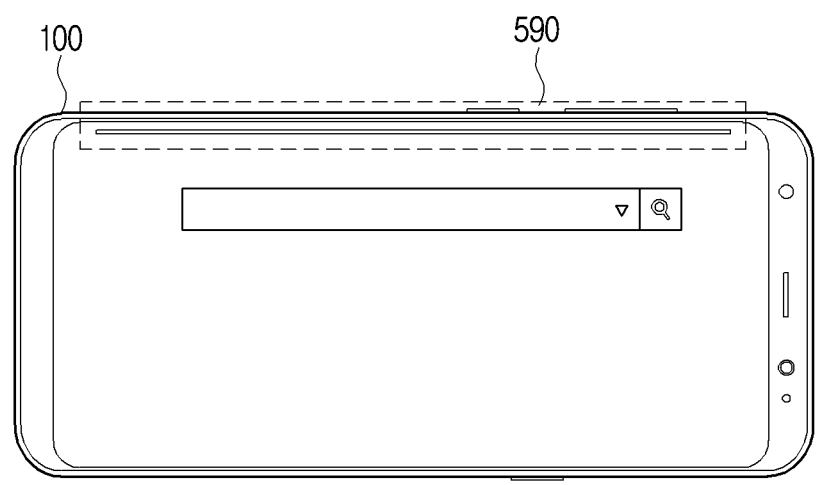
FIG. 5D is a diagram illustrating a UI provided when a trigger pose is identified according to an embodiment.

For example, referring to FIG. 5D, the processor 140 may control the display 120 to display visual feedback (e.g., edge lighting) on a particular region 590 (e.g., an edge region, etc.) of the display 120 as notification information. Alternatively, the processor 140 may display the text or image as notification information on the display 120, may emit or flash light through a light emitting unit (e.g., a light emitting diode (LED)) separately provided in a region other than the screen of the display 120 as notification information, and/or may control to output an alert sound or the voice as notification information through the speaker 180.

If the trigger pose is identified in the plurality of first image frames, the processor 140 may detect the motion of the plurality of fingers in the plurality of second image frames obtained subsequently in operation S340. If the motion of the plurality of fingers is detected in the plurality of second image frames 610 in operation S340—Y, the processor 140 may identify a key corresponding to the motion in operation S350. A method for identifying a key corresponding to motion is described below with reference to FIGS. 7, 8A to 8C, 9A to 9D, 10A and 10B, 11 and 12.

The motion may refer to a movement (or gesture) of a finger for entering a particular key, and may indicate that at least one finger among the plurality of fingers is moved to a position on a particular plane (or a position within a predetermined height from a particular plane). For example, a motion for entering a particular key may be, as illustrated in FIG. 5A(a), that a first state where all the plurality of fingers of the left hand 520L and the right hand 520R identified from the image frame 510 are apart from a specific plane by a first predetermined distance or more (e.g., 1 cm or more from the bottom), is changed to a second state where one finger (ring finger 634 of the left hand 620L) among the plurality of fingers of the left hand 620L and the right hand 620R identified in the image frame 610 are apart from a specific plane by less than a second predetermined distance (e.g., less than 0.2 cm from the bottom). The second state may include a state in which the user's finger is placed on a particular plane (e.g., bottom surface) or in contact therewith. Further, a particular plane may refer to a plane that is a criterion for determining a motion, and may include a plane on the surface of the various objects, such as a desk, a table, etc., detected within the image frame or a plane in space or air.

Figure 6A:
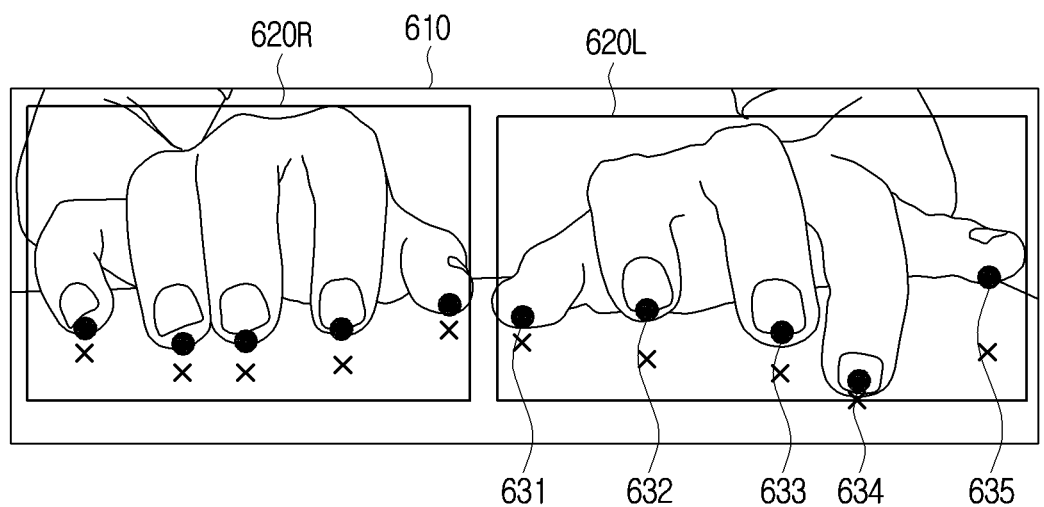
FIG. 6A is a diagram illustrating a user's motion according to an embodiment.
Figure 6B:
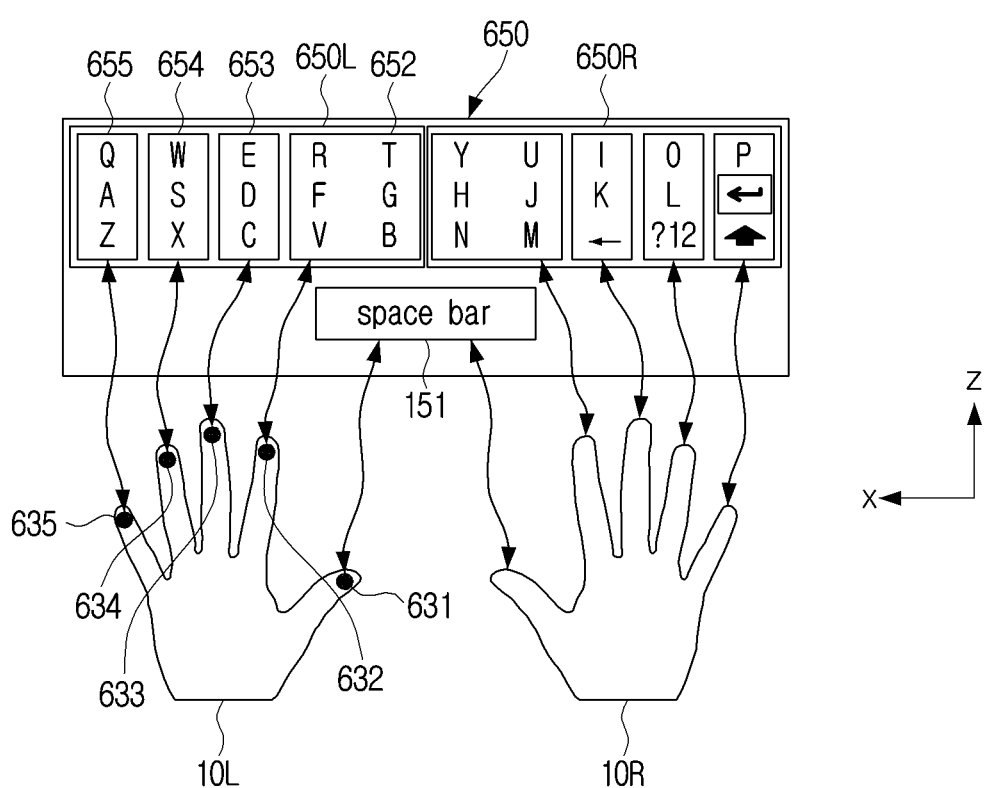
FIG. 6B is a diagram illustrating a key mapped to a user's finger according to an embodiment.

A plurality of keys included in the virtual keyboard 650 may be mapped to each of the plurality of fingers, as exemplarily shown in FIG. 6B, and the memory 130 may prestore information on a plurality of keys mapped to each of the plurality of fingers.

Referring to FIG. 6B, the virtual keyboard 650 may include a plurality of keys. The plurality of keys included in the virtual keyboard 650 may be grouped according to a position (e.g., X-axis position and Z-axis position, or row and column, etc.). In this example, a plurality of keys grouped according to the type of hand (e.g., left hand 10L and right hand 10R) and the type of finger (e.g., thumb 631, index finger 632, middle finger 633, ring finger 634, little finger 635, etc.) may be mapped.

The virtual keyboard 650 may include a first layout 650L that is mapped to the user's left hand 10L and a second layout 650R that is mapped to the user's right hand 10R. The first layout 650L includes a plurality of keys arranged on the left side among the keys included in the virtual keyboard 650, and the second layout 650R may include a plurality of keys arranged on the right side of the keys included in the virtual keyboard 650.

Referring to the first layout 650L mapped to the left hand 10L with reference to FIG. 6B, a plurality of keys 652 (e.g., R, F, V, T, G, and B keys) in a first row of the first layout 650L may be mapped to the index finger 632 of the left hand 10L, a plurality of keys 653 (e.g., E, D, and C keys) in a second row may be mapped to the middle finger 633 of the left hand 10L, a plurality of keys 654 (e.g., W, S, and X keys) in a third row may be mapped to the ring finger 634 of the left hand 10L, and a plurality of keys 655 (e.g., Q, A, and Z keys) in a fourth row may be mapped to the little finger 635 of the left hand 10L. This is merely exemplary, and various modifications may be made. Further, a user may customize or modify the mappings via a user interface in accordance with an embodiment.

The plurality of keys mapped to the finger may include a reference key and at least two keys adjacent to the reference key. Here, the reference key may refer to a key used to identify a key corresponding to the motion of the finger. The reference key may be determined (or set) based on the type of finger (e.g., thumb to little fingers of the left hand or right hand) of the included finger among the keys included in the virtual keyboard. That is, one key per finger may be set as the reference key.

For example, referring to the reference key mapped to the left hand 10L of FIG. 6B, the reference key of the index finger 632 may be set to an F key among a plurality of keys 652 in the first row mapped to the index finger 632, the reference key of the middle finger 633 may be set to a D key among a plurality of keys 653 in the second row mapped to the middle finger 633, a reference key of the ring finger 634 may be set to an S key among a plurality of keys 654 in the third row mapped to the ring finger 634, and a reference key of the little finger 635 may be set to an A key among a plurality of keys 655 in the fourth row mapped to the little finger 635. It is understood that this is merely exemplary, and various modifications may be made.

In the example of the second layout 650R mapped to the right hand 10R, a plurality of keys may be mapped to each finger of the right hand 10R in the same manner. It is also possible to map a particular key to the left hand 10L and right hand 10R in an overlapping manner. For example, a space bar 151 may be mapped to the thumb 631 of the left hand 10L and the thumb of the right hand 10R. However, it is understood that this is merely exemplary, and various modifications may be made.

The plurality of keys included in the virtual keyboard may include text keys (e.g., characters such as Q, W, E, numbers such as 1, 2, 3, symbols such as !, @, #, or the like), control keys (e.g., Ctrl, Alt, Esc, or the like), search keys (e.g., arrow key, Home, End, Page Up, Page Down, Delete, Insert, or the like), and function keys (e.g., F1, F2, F3, or the like) according to functions, and corresponding information (e.g., text, control, search, function, or the like) may be preset to each of the plurality of keys.

If a key corresponding to the motion is identified, the processor 140 may display information corresponding to the identified key in operation S360. For example, referring to FIG. 6C, if it is identified that a key corresponding to a motion is a W key, the processor 140 may display the character "W" that is the information corresponding to the W key on a text input window 660 of the display 120.

According to an embodiment, when (or based on) the processor 140 identifies a key (e.g., a W key) corresponding to the motion, the processor 140 may display the identified key among the keys included in the virtual keyboard to be distinguished from other keys. For example, referring to FIG. 6C, while the virtual keyboard 650 is displayed on the display 120 as the trigger pose is identified, when the key corresponding to the motion is identified as the W key, the processor 140 may display visual feedback (e.g., a visual element such as a ring and figure, an enlargement or reduction effect, a highlight effect, etc.) to distinguish the W key 670 from other keys in the virtual keyboard 650. The processor 140 may control the display 120 to display the current position of each finger on the virtual keyboard 650.

According to another embodiment, when a key (e.g., a W key) corresponding to the motion is identified, the processor 140 may control the speaker 180 to output a sound (e.g., a notification sound or voice, etc.) corresponding to the identified key. Further, according to another embodiment, the processor 140 may control to generate a vibration corresponding to the identified key once a key (e.g., a W key) corresponding to the motion is identified. In this example, the processor 140 may control a vibration motor, a haptic motor, or the like included in the electronic apparatus 100 to generate vibration, and/or may communicate with a wearable device such that the wearable device attached to the user's body vibrates.

When a key corresponding to the motion is identified, the electronic apparatus 100 may provide the user with a physical or cognitive feedback according to a key input and may improve a feedback problem that may occur in a virtual interface environment.

If the key corresponding to the motion is a deletion key (e.g., a delete key, a backspace key, or the like) for deleting information on the display 120, the processor 140 may delete information (e.g., W, etc.) displayed on the display 120 and adjust transparency of the virtual keyboard 650 based on the frequency of deleting the information.

Figure 6C:
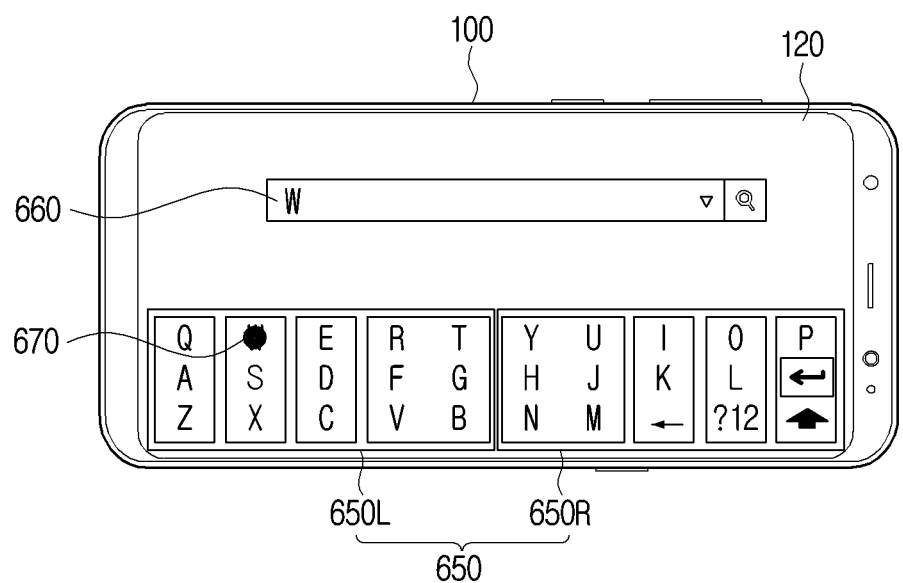
FIG. 6C is a diagram illustrating information displayed by a user's motion according to an embodiment.
Figure 6D:
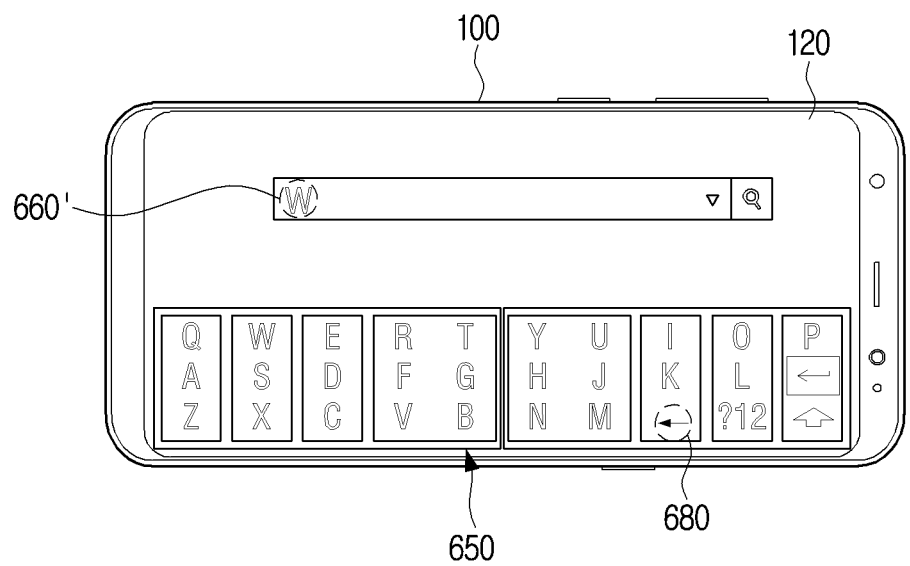
FIG. 6D is a diagram illustrating a method for adjusting transparency of a virtual keyboard according to an embodiment.

For example, as illustrated in FIG. 6C, while information (e.g., W, etc.) is displayed on the text input window 660 of the display 120, if the key corresponding to the motion is identified as a backspace key 680 for deleting the information displayed on the display 120, the processor 140 may delete the information (e.g., W, etc.) displayed on a text input window 660' as illustrated in FIG. 6D.

The processor 140 may adjust the transparency of the virtual keyboard 650 based on a frequency of deleting information as shown in FIG. 6D.

The transparency of the virtual keyboard 650 may refer to a level (degree) to which the virtual keyboard 650 is displayed in a transparent manner, and the virtual keyboard 650 may be displayed on the display 120 transparently with a level proportionate to a level of transparency. For example, if the transparency is a maximum value (e.g., 100), the virtual keyboard 650 may be displayed on the display 120 transparently, and if the transparency is a minimum value (e.g., 0), the virtual keyboard 650 may be displayed on the display 120 completely opaque.

The frequency of deleting information may refer to or be based on the number of times that a key corresponding to a motion is identified as a deletion key to delete information displayed on the display 120. The higher the frequency of deleting information, the higher the error rate.

The processor 140 may adjust the transparency of the virtual keyboard 650 in inverse proportion to the frequency at which the information is deleted. For example, the processor 140 may adjust the transparency of the virtual keyboard 650 to decrease in order to improve visibility of the keyboard 650, as the frequency of deleting the information increases. On the other hand, the processor 140 may adjust the transparency of the virtual keyboard 650 to be increased to improve visibility of information as the frequency of deleting the information is lowered. According to an embodiment, the frequency of deleting the information may include the number of times the information is deleted for a predetermined period of time (e.g., predetermined or pre-set period of time). Here, the predetermined time may be set to various times in units of seconds, minutes, hours, days, weeks, months, years, or the like.

According to another embodiment, the frequency of deleting information may include or be based on the number of times of deleting information from among the total number of times of identifying a key corresponding to a motion or the number of times of deleting information from among a predetermined number of times of identifying a key corresponding to a motion.

As described above, an interface environment is capable of adjusting transparency of the virtual keyboard 650, of guiding a user's motion according to an error rate, and of representing proficiency of a user in a quantifiable manner.

The processor 140 may control so that the virtual keyboard 650 is not displayed on the display 120 for a user of which the frequency of deleting information is less than a predetermined value, and control so that the virtual keyboard 650 is displayed on the display 120 for a user of which the frequency of deleting information is greater than or equal to a predetermined value. In other words, based on an identified or determined frequency of deleting information, the processor 140 may determine to control whether to display the virtual keyboard 650 accordingly.

For example, if the processor 140 identifies the plurality of fingers detected in the plurality of first image frames 510 and 530 as corresponding to the trigger pose, the processor 140 may control so that the virtual keyboard 650 is not displayed on the display 120 for a user of which the frequency of deleting information is less than a predetermined value based on the frequency of deleting corresponding to the user, and may control so that the virtual keyboard 650 is displayed on the display 120 for a user of which the frequency of deleting information is greater or equal to a predetermined value.

The processor 140 may store the frequency of deleting information in or mapped to a user account. The user account may include intrinsic information of a user accessible through log-in (or authentication), and may be stored in the electronic apparatus 100 or external device (e.g., server, or the like).

As described above, in order to increase the amount of information (e.g., images, characters, etc.) displayed on the screen of the display 120 of the electronic apparatus 100 for a user with a low error rate (i.e., a user who can correctly input the desired key without a separate guide), the virtual keyboard 650 may not be displayed on the display 120, and the virtual keyboard 650 may be displayed on the display 120 for a user with a high error rate so as to decrease the error rate.

A method of correcting a typing error according to an embodiment is described below with reference to FIG. 13.

Hereinbelow, a method for determining a key corresponding to motion according to an embodiment is described with reference to FIGS. 7, 8A to 8C, 9A to 9D, 10A and 10B, 11 and 12.

Figure 7:
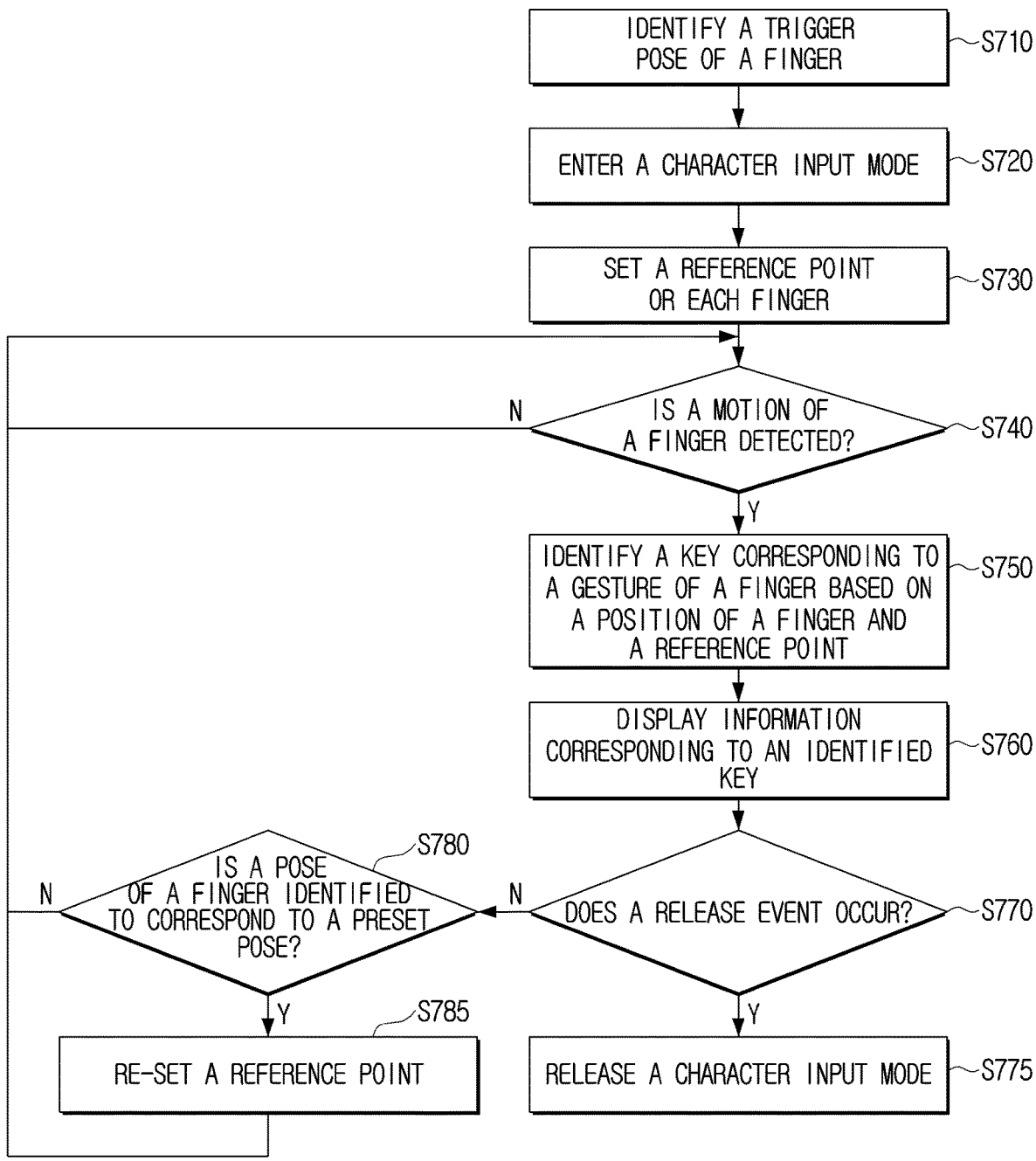
FIG. 7 is a flowchart illustrating a method for identifying a key corresponding to a motion according to an embodiment.

FIG. 7 is a diagram illustrating a method for identifying a key corresponding to a motion according to an embodiment.

Referring to FIG. 7, the processor 140 may detect a plurality of fingers in a plurality of first image frames obtained through the camera 110 and identify (or determine) whether a pose of the plurality of detected fingers corresponds to a trigger pose in operation S710. This operation may correspond to the above description of operation S320 of FIG. 3.

If the pose of the plurality of fingers detected in the plurality of first image frames is identified (or determined) as corresponding to the trigger pose, the processor 140 may enter the character input mode in operation S720. If the pose of the plurality of fingers detected in the plurality of first image frames is identified (or determined) as corresponding to the trigger pose, the processor 140 may set a reference point for each finger based on the detected position of the plurality of fingers in operation S730. Here, operations S720 and S730 may be performed at the same time, or the order may be changed.

The processor 140 may detect a motion of one finger among a plurality of fingers in the plurality of second image frames obtained through the camera 110 in the character input mode in operation S740.

If the motion of the finger is detected in the plurality of second image frames in operation S740—Y, the processor 140 may identify (or determine) a key corresponding to the motion among the plurality of keys mapped to the finger based on the position of the finger detected by the motion and the position of the reference point set to the finger in operation S750. If the motion of the finger is not detected in the plurality of second image frames in operation S740—N, the processor 140 may detect the motion of one of the plurality of fingers in the plurality of image frames obtained after the plurality of second image frames through the camera 110 in operation S740.

The processor 140 may control the display 120 to display information corresponding to the identified (or determined) key in operation S760.

The processor 140 may identify whether a release event has occurred in operation S770. If the processor 140 identifies that a release event has occurred in operation S770—Y, the processor 140 may release the character input mode in operation S775. That is, the processor 140 may detect the motion of the finger and terminate the operation of identifying the motion as a key corresponding to the motion. In this example, the release event may include an event that the application is terminated, an event that the user's hand is not detected for a predetermined time (e.g., 15 seconds, 30 seconds, one minute, etc.), or the like, in a plurality of image frames, or the like.

If the release event is identified as not occurring (or is not identified as occurring) in operation S770—N, the processor 140 may maintain a state of entering the character input mode.

In this example, the processor 140 may detect a plurality of fingers in a plurality of third image frames obtained through the camera 110 in the character input mode and identify whether the pose of the plurality of fingers corresponds to a predetermined pose in operation S780.

If the pose of the plurality of fingers detected in the plurality of third image frames is identified as corresponding to the predetermined pose in operation S780—Y, the processor 140 may reset the reference point for each finger based on the position of the plurality of fingers in operation S785. In this example, if the motion of one finger among the plurality of fingers is detected in the plurality of fourth image frames obtained after the plurality of third image frames through the camera 110 in operation S740—Y, the processor 140 may identify (or determine) a key corresponding to the motion among the plurality of keys mapped to the finger based on the position of the finger by the motion and the position of the reference point reset to the finger in operation S750. The processor 140 may control the display 120 to display information corresponding to the identified (or determined) key in operation S760.

Alternatively, the processor 140 may not reset the reference point for each finger if the pose of the plurality of fingers detected in the plurality of third image frames is identified as not corresponding to a predetermined pose in operation S780—N. In this example, if the motion of one finger among the plurality of fingers is detected in the plurality of fourth image frames obtained after the plurality of third image frames through the camera 110 in operation S740—Y, the processor 140 may identify (or determine) a key corresponding to the motion among the plurality of keys mapped to the finger based on the position of the finger by the motion and the position of the reference point set to the finger (i.e., the most recently set or most recently reset reference point) in operation S750. The processor 140 may then control the display 120 to display information corresponding to the identified (or determined) key in operation S760.

While the operations S780 and S785 for resetting the reference point are shown to be performed after the operation S760 of displaying information corresponding to the key identified (or determined) in FIG. 7, this is shown sequentially for convenience of description. According to another example, the operations S780 and S785 for resetting the reference point may be performed in parallel with the motion detection operation S740 to the display operation S760 of the finger after the operation S730 of setting the reference point for the finger. Furthermore, the operations S780 and S785 for resetting the reference point may be periodically performed for every predetermined period (e.g., twice a second, once a second, or the like).

The electronic apparatus 100 according to various embodiments as described above may provide an interface capable of recognizing a motion of a user as an input. The electronic apparatus 100 may, by dynamically resetting the reference point, improve the recognition rate so as to recognize the user motion as an input desired by the user, and provide an interface environment where convenience and rapidity are improved.

Hereinbelow, with reference to the attached drawings, specific details of each operation of FIG. 7 are described.

Figure 8A:
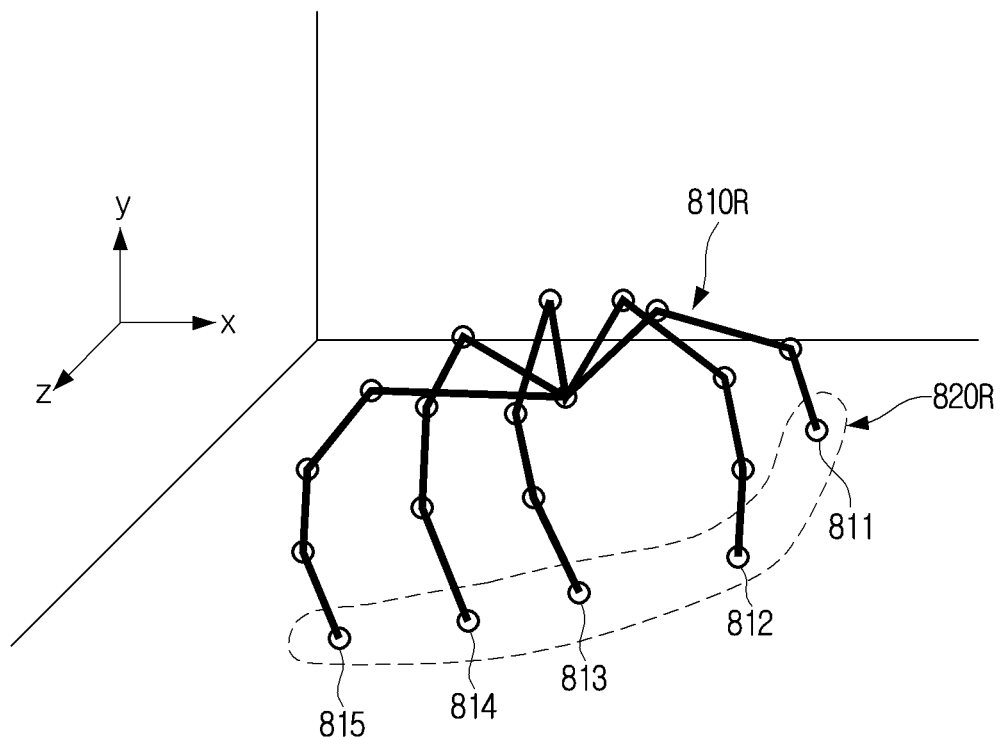
FIG. 8A is a diagram illustrating a method for setting a reference point according to an embodiment.
Figure 8B:
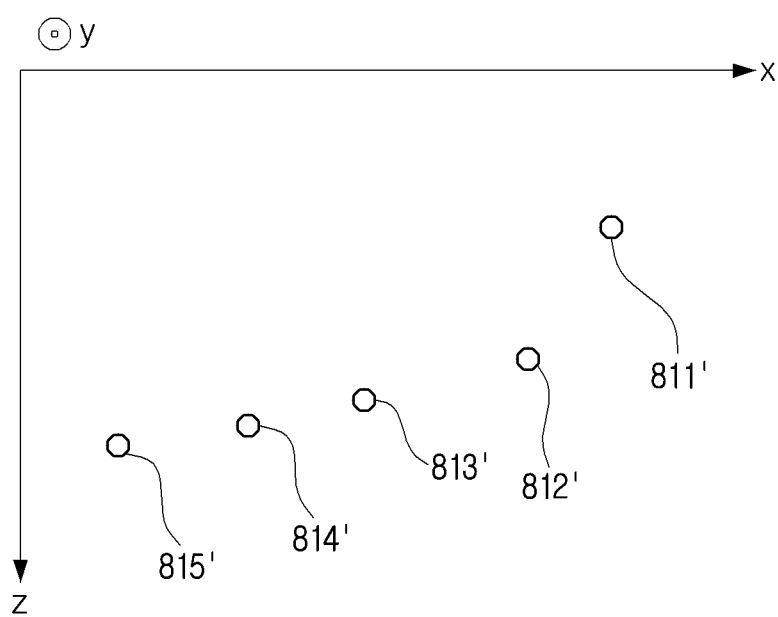
FIG. 8B is a diagram illustrating a method for setting a reference point according to an embodiment.
Figure 8C:
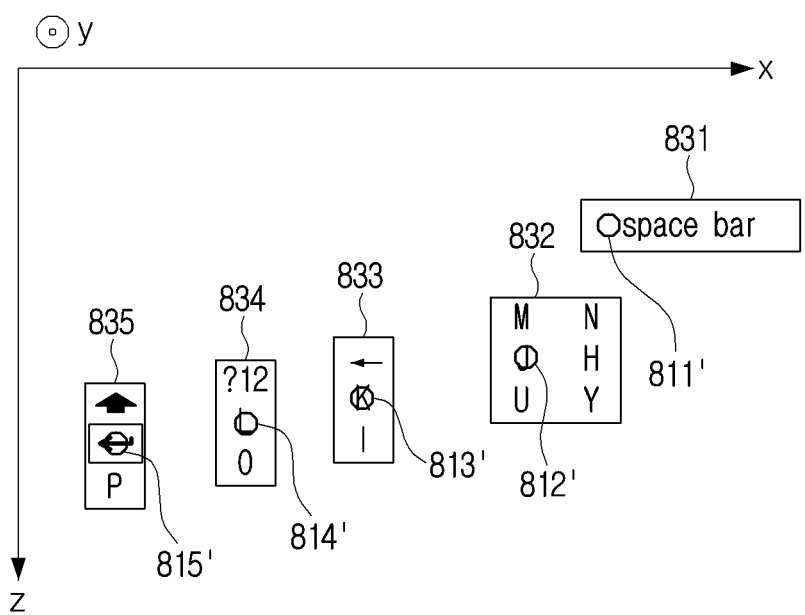
FIG. 8C is a diagram illustrating a method for setting a reference point according to an embodiment.

FIGS. 8A to 8C are diagrams illustrating a method for setting a reference point according to an embodiment. FIGS. 8A to 8C merely illustrate a right hand 810R of the user detected in a plurality of image frames for convenience, but the description may be applied to the left hand of the user in the same manner.

Referring to FIGS. 8A and 8B, the processor 140 may detect (or control to detect) a plurality of fingers in a plurality of first image frames. If (or based on) the pose of the detected plurality of fingers is identified as corresponding to a trigger pose, the processor 140 may enter a character input mode in operation S720 and set a reference point for each finger based on the detected position of the plurality of fingers in operation S730.

The trigger pose may be preset as a pose that is changed from the first state in which the user's finger is spaced apart from a specific plane by a first predetermined distance (e.g., 1 cm) or more as illustrated in FIG. 5A(a) to a second state in which the user's finger is spaced apart from a specific plane (e.g., a bottom surface) by less than a second predetermined distance (e.g., 0.2 cm). Here, the first state and the second state correspond to an embodiment, and various modifications can be made in one or more other embodiments. According to an embodiment, the second state may be a state in which the finger is placed on a particular plane or a state in which the finger contacts a particular plane (i.e., the user's finger is not spaced on a particular plane (e.g., the bottom surface of the table, etc.)), as described above with reference to FIGS. 5A and 5B.

It will be assumed that a plurality of fingers are detected from a plurality of first image frames and a pose of a plurality of detected fingers corresponds to a trigger pose.

If it is identified that the pose of the plurality of fingers detected from the plurality of first image frames corresponds to the trigger pose, the processor 140 may set a reference point 811' to 815' for each finger based on the positions 811 to 815 of the plurality of detected fingers.

The reference points 811' to 815' for each finger may refer to a point of criterion to determine position (or distance, direction) of each finger by the motion of the finger.

The position of the plurality of fingers (thumb to little finger) may correspond to a position of a keypoint (e.g., a keypoint for a fingertip portion or a keypoint for a joint) for each finger among the plurality of keypoints 450 identified by the processor 140. The processor 140 may set one of the keypoints 451-1 to 451-4 included in the plurality of first keypoints 451 for the thumb as a reference point 811' for the thumb. In the same or similar manner, the processor 140 may set a position of one of the keypoints included in the plurality of second keypoints 452 for the index finger as a reference point 812' for the index finger, set one of the keypoints included in the plurality of third keypoint 453 for the middle finger as a reference point 813' for the middle finger, set one of the keypoints included in the plurality of fifth keypoints 455 for the little finger as a reference point 815' for the little finger.

For convenience, it has been described that a position of a plurality of fingers is a position of the keypoint for a fingertip of the plurality of fingers (thumb to little finger).

As illustrated in FIG. 8A, the processor 140 may set a region based on the position of the keypoints 811 to 815 for each finger as a reference region 820R. Here, the reference region 820R may refer to a region that is a criterion for determining the motion of a finger, and may include a region from a line connecting the keypoints 811 to 815 for each finger to a predetermined distance.

Referring to FIG. 8C, the processor 140 may map a plurality of keys included in the virtual keyboard 650 to each of the plurality of fingers.

The plurality of keys mapped to the finger may include the reference key and at least two keys adjacent to the reference key, as described above with reference to FIG. 6B.

The processor 140 may map the plurality of keys 831 to 835 mapped to the finger to be positioned at the reference points 811' to 815' set to the finger. For example, the processor 140 may map so that the reference key among the plurality of keys 831-835 is positioned at the reference points 811' to 815' set to the finger.

In at least one key 830 mapped to the right thumb, a reference key (e.g., space bar) of the right thumb may be positioned at a reference point 811' set to the right thumb, in a plurality of keys 832 mapped to the right index finger, a reference key (e.g., J key) of the right index finger is positioned at a reference point 812' set to the right index finger, in a plurality of keys 833 mapped to the right middle finger, a reference key (e.g., K key) of the right middle finger is positioned at a reference point 813' set to the right middle finger, in a plurality of keys 834 mapped to the right ring finger, a reference key (e.g., L key) of the right ring finger may be positioned at a reference point 814' set to the right ring finger, and in a plurality of keys 835 mapped to the right index finger, a reference key (e.g., enter key) of the right little finger may be positioned at a reference point 815' set to the little finger.

In operation S740, the processor 140 may detect a motion of one of the plurality of fingers in the plurality of second image frames obtained through the camera 110 after the plurality of first image frames in operation S740. In this case, if the motion of the finger is detected in the plurality of second image frames in operation S730—Y, the processor 140 may identify (or determine) a key corresponding to the motion among the plurality of keys mapped to the finger based on the position of the finger detected by the motion and the position of the reference point set to the finger in operation S750. This is described with reference to FIGS. 10A and 10B which illustrate a method of determining a key corresponding to motion according to an embodiment.

The motion of a finger may refer to a gesture on a user's finger to enter a particular key. The motion of the finger may be detected through a change in the position of the keypoint relative to the finger.

The processor 140 may identify each of the plurality of fingers in a plurality of second image frames obtained through the camera 110 with a keypoint for each finger (e.g., a keypoint for the fingertip portion, or a keypoint for the joint, etc.).

Figure 10A:
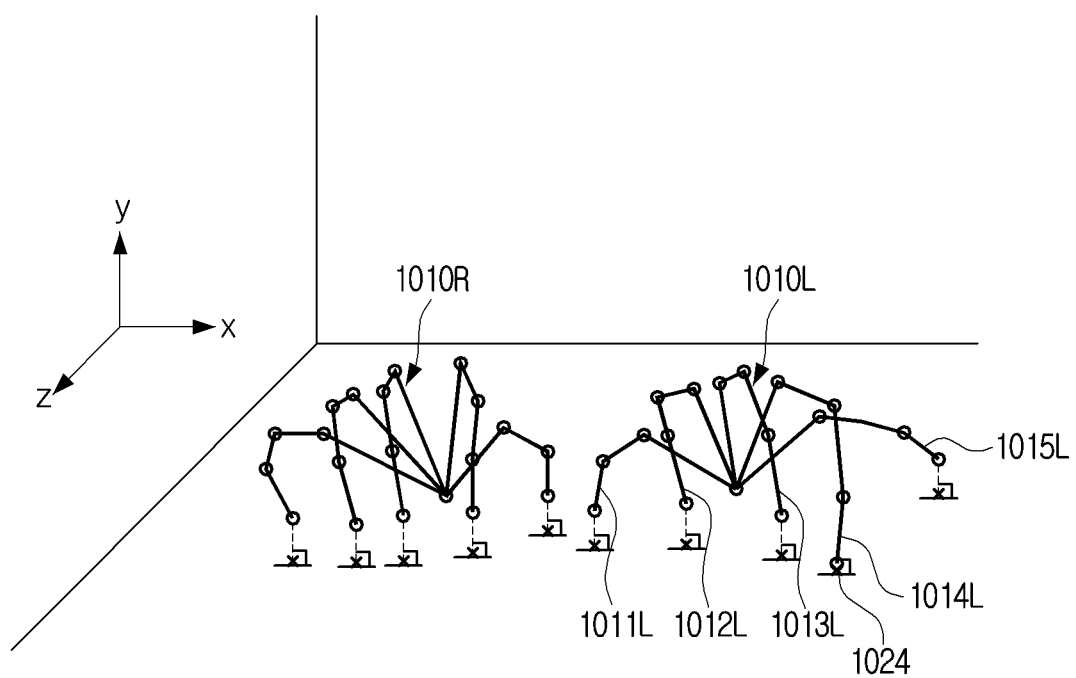
FIG. 10A is a diagram illustrating a key corresponding to a motion according to an embodiment.

In the plurality of second image frames, the fingers of the left hand 634 may be moved to a position less than a predetermined height based on a specific plane, and the remaining fingers may be at a position that is higher than or equal to a specific plane as illustrated in FIG. 6A. For example, as illustrated in FIG. 10A, the processor 140 may identify, in a plurality of fingers in a plurality of second image frames, a plurality of first keypoints 1011L for the left thumb in the case of the left hand, and a plurality of second keypoints 1012L for the index finger in the left hand, a plurality of third keypoints 1013L for the left middle finger, the plurality of fourth keypoints 1014L for the left ring finger, and a plurality of fifth keypoints 1015L for the left hand little finger. The plurality of first to fifth keypoints for a plurality of fingers of the right hand may be identified in the same manner.

The processor 140 may detect the position (or motion) of each finger through the position (or position change) of the keypoints for each finger identified in the plurality of second image frames. The position of the finger may be a position of a predetermined keypoint in one of a keypoint for a finger (e.g., a keypoint for a fingertip portion or a keypoint for a joint of a finger). In the following description, for convenience, it is assumed that the keypoints for the fingertip portions are predetermined.

The processor 140 may detect a motion of one of a plurality of fingers (a keypoint for one finger) based on a position of each of a plurality of fingers (a keypoint for a plurality of fingers). The motion may refer to the position (or posture) of the finger for typing a particular key (e.g., w key).

For example, as illustrated in FIG. 10A, the processor 140 may detect a user's finger (or a keypoint of a finger), among a plurality of fingers (or keypoints of a plurality of fingers), which moves from a position (e.g., P1(x1, y1, z1), y1 is 2 or more) greater than or equal to a preset height (e.g., 2 on y-axis) relative to a particular plane (e.g., xz plane) to a particular position (e.g., P2(x2, y2, z2), y2 is less than 2) less than a predetermined height as a motion of the finger.

The processor 140 may identify a position of the finger of which motion is detected. The position of the finger of which motion is detected (or finger by the motion) may refer to the finger (position of a keypoint 1024 for the finger (e.g., P2 (x2, y2, z2)) moved to the position less than a predetermined height from a specific plane.

The processor 140 may identify a type of finger where the motion is detected (e.g., the thumb to little finger of the left hand or right hand). The type of finger in which motion is detected may refer to the type of finger (keypoint 1024 for a finger) that has been moved to a position less than a predetermined height based on a particular plane.

The processor 140 may identify (or determine) a key corresponding to a motion among a plurality of keys mapped to the finger based on a position of the finger by the motion and a position of a reference point set to the finger in operation S750.

The position of the reference point set on the finger may refer to the position of the reference point set on a finger (e.g., a thumb to little finger of the left or right hand) where the motion is detected among a plurality of reference points. Each of the plurality of reference points may be set or reset for each finger through the process of FIGS. 8A to 8C and 9A to 9D. For example, a plurality of reference points may include a reference point for the thumb (1031L, 1031R), a reference point for the index finger (1032L, 1032R), a reference point for the middle finger (1033L, 1033R), a reference point for the ring finger (1034L, 1034R), and a reference point for the little finger (1035L, 1035R).

Figure 10B:
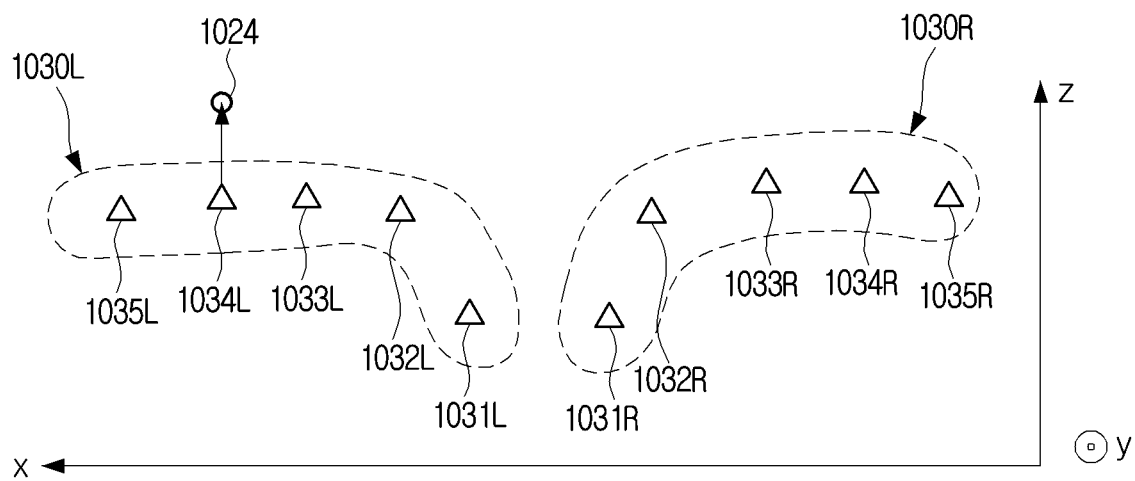
FIG. 10B is a diagram illustrating a method for identifying a key corresponding to a motion according to an embodiment.
Figure 10B:
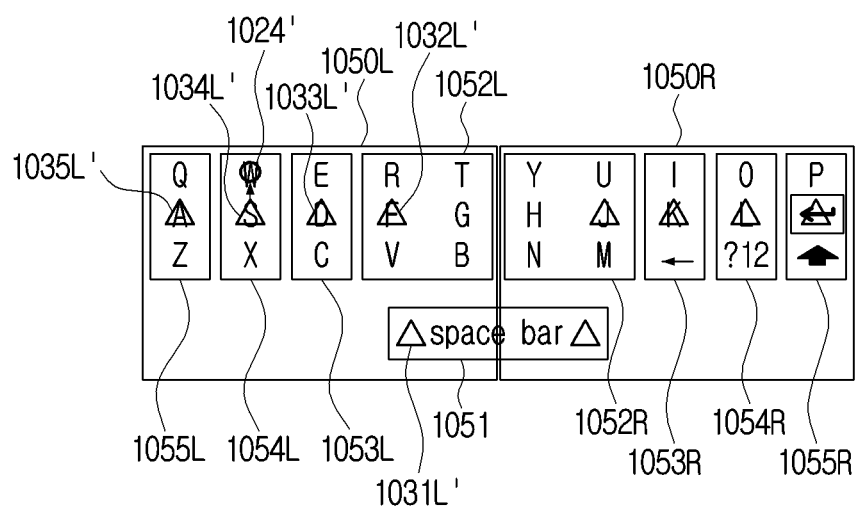

According to an embodiment, it will be assumed that the finger where the motion is detected is the left ring finger as illustrated in FIGS. 10A and 10B.

If (or based on) the distance between the position of the finger by the motion (e.g., the position of the keypoint 1024 with respect to the left hand ring finger of which motion is detected) and the position of the reference point set in the finger (e.g., the reference point 1034L set in the left hand ring finger) is less than a predetermined value, the processor 140 may identify the reference key (e.g., the reference key mapped to the left hand ring finger: S key 1034L' among the plurality of keys 1054L mapped to the left ring finger) as a key corresponding to the motion.

The processor 140 may identify the distance between a position 1024 of the finger of which motion is detected and a position of the reference point set to the finger of which motion is detected.

When (or based on) the distance between the position of the finger by a motion (e.g., a position of the keypoint 1024 for left ring finger where the motion is detected) and a position of the reference point set to the finger (e.g., the reference point 1034L set to the left ring finger) is greater than or equal to a predetermined value, the processor 140, based on a movement direction (e.g., +z direction, or the like) of the finger by the motion, may identify a key (e.g., W key 1024' for +z direction) positioned in the movement direction from the reference key (e.g., reference key mapped to left ring finger: S key 1034L') among the plurality of keys (e.g., a plurality of keys 1054L mapped to left ring finger), as a key corresponding to the motion.

The processor 140 may identify the distance between the position of the finger where the motion is detected and a position of the reference point set to the finger. The processor 140 may identify a direction in which the finger detected by the motion moves.

The processor 140 may identify one of a plurality of keys mapped to the finger where a motion is detected as a key corresponding to the motion based on a reference key and a vector corresponding to the reference point set to the finger where a motion is detected.

For example, the processor 140 may identify a relative vector between the keypoint 1024 for the left ring finger where a motion is detected and the reference point 1034L set to the left ring finger where a motion is detected. The processor 140 may calculate an end point of the vector by applying the position of the reference key (e.g., the S key 1034L') mapped to the left ring finger where a motion is detected to the vector as a starting point (or initial point), and identify the key located at an end point among the plurality of keys (e.g., a plurality of keys 1054 mapped to the left ring finger) mapped to the finger where a motion is detected as a key corresponding to the motion.

The processor 140 may detect a motion for typing a key different from the above key to identify a key corresponding to a motion.

The processor 140 may control the display 120 to display information corresponding to an identified (or determined) key in operation S760.

It will be assumed that the release event has not occurred in operation S770—N. That is, it will be assumed that the character input mode is maintained.

In this example, the processor 140 may detect a plurality of fingers in a plurality of third image frames obtained through the camera 110 in the character input mode, and identify whether a pose of the detected plurality of fingers corresponds to a predetermined pose in operation S780. If the pose of the plurality of fingers detected in the plurality of third image frames is identified as corresponding to the predetermined pose in operation S780—Y, the processor 140 may reset the reference point for each finger based on the detected position of the plurality of fingers in operation S785.

Hereinafter, a method of resetting a reference point according to an embodiment is described in detail with reference to FIGS. 9A through 9D. FIGS. 9A to 9D merely illustrate a right hand 910R of the user detected from a plurality of image frames for convenience, and it is understood that the description may be applied to the user's left hand in the same manner.

Figure 9A:
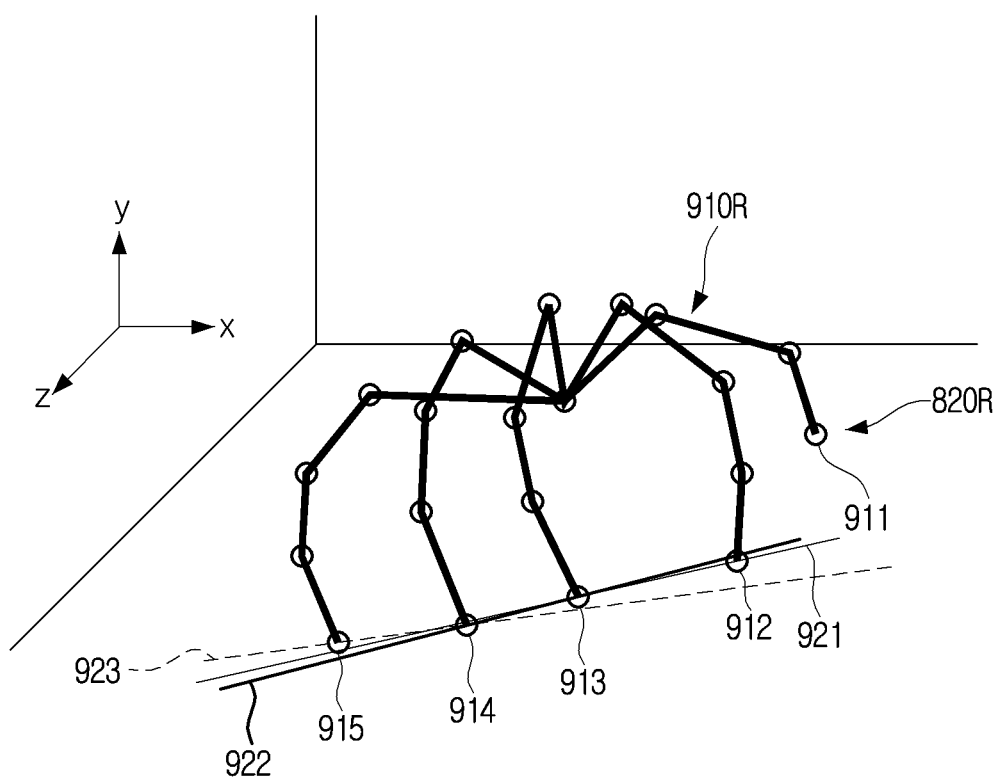
FIG. 9A is a diagram illustrating a method for re-setting a reference point according to an embodiment.

Referring to FIG. 9A, the processor 140 may detect a plurality of fingers (keypoints 911 to 915 for a plurality of fingers) from the plurality of third image frames obtained after the plurality of second image frames while the character input mode is maintained.

If the processor 140 identifies the plurality of fingers (keypoints 911-915 for the plurality of fingers) detected in the plurality of third image frames as corresponding to the predetermined pose, the processor 140 may reset the reference point for each finger based on the position of the plurality of fingers (keypoints 911-915 for the plurality of fingers). In this example, the reference point may be reset to a position of a plurality of fingers identified as corresponding to a predetermined pose (e.g., keypoints 911 to 915 for a fingertip portion, or a keypoint for a joint, etc.).

The preset pose may refer to a pose of the finger for which a relative relation is established based on the position of the plurality of fingers to reset (or update) a reference point at a current position of the plurality of fingers in consideration of moving of a user's finger. Various embodiments are described below with reference to FIGS. 9B to 9D.

Here, if it is identified that the plurality of fingers detected in the plurality of third image frames are maintained for a predetermined time (e.g., one second, two seconds, etc.), the processor 140 may reset the reference point for each finger based on the detected position of the plurality of fingers.

The processor 140 may identify whether the pose of the detected plurality of fingers corresponds to a predetermined pose based on a keypoint (keypoints 912-915 for the fingertip or a keypoint for the joint) of the remaining fingers other than the thumb of the plurality of fingers detected in the plurality of third image frames.

Hereinafter, a predetermined pose is described with reference to FIGS. 9A through 9D. The predetermined pose may refer to a pose of a finger in which a relative relationship based on the position of the plurality of fingers is set as described above. The relative relationship may include the angle between the straight lines when the plurality of straight lines are generated by connecting the positions of each of the plurality of fingers, and the width of a polygon formed in the straight line, or the like.

The processor 140 may generate a plurality of straight lines (e.g., three straight lines 921 through 923) based on the position of the keypoints of the remaining fingers other than the thumb. For convenience of description, it is assumed that the keypoints of the remaining fingers except for the thumb are the keypoints 912 to 915 for the fingertip portions of the remaining fingers.

For example, the processor 140 may generate a first straight line 921 connecting a keypoint 912 for a fingertip portion of the index finger and a keypoint 913 for a fingertip portion of the middle finger, a second straight line 922 connecting a keypoint 913 for a fingertip portion of the middle finger and a keypoint 914 for a fingertip portion of the ring finger, and a third straight line 923 connecting the keypoint 914 of the fingertip portion of the little finger and the keypoint 915 for the fingertip portion of the little finger.

Figure 9B:
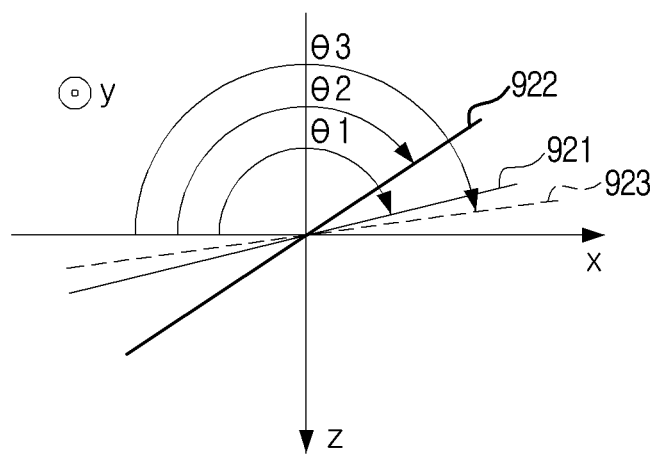
FIG. 9B is a diagram illustrating a method for re-setting a reference point according to an embodiment.

According to an embodiment, the predetermined pose may be set to a pose of the plurality of fingers, such that the absolute angles $\theta1$ to $\theta3$ for each of the first to third straight lines 921 to 923, which are identified by the rest of the fingers other than the thumb, are greater than or equal to a predetermined value, as illustrated in FIG. 9B. For example, the absolute angle $\theta1$ for a first straight line 921, the absolute angle $\theta2$ for a second straight line 922, and the absolute angle $\theta3$ for a third straight line 923 relative to the x-axis may be set to the pose of the plurality of fingers that are greater than or equal to a predetermined value (e.g., greater than or equal to 170 degrees) and/or less than a predetermined value (e.g., less than 10 degrees, etc.)

Figure 9C:
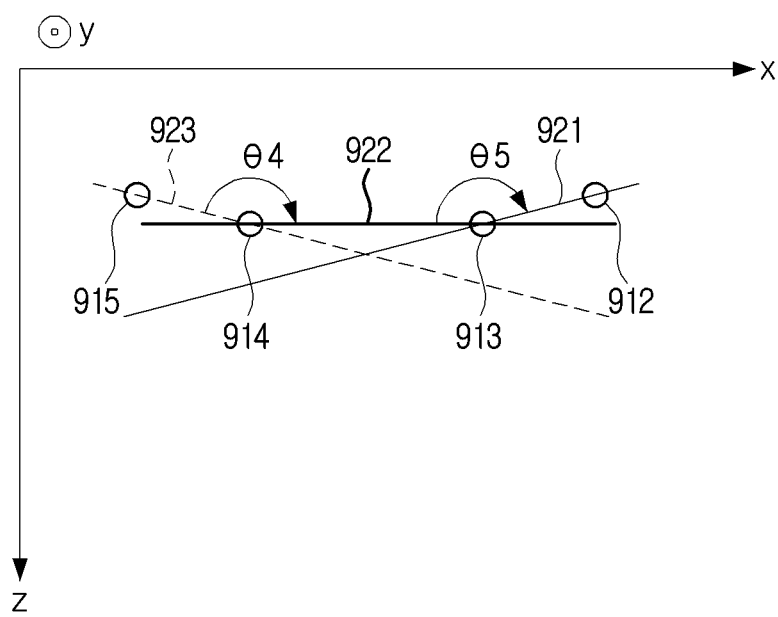
FIG. 9C is a diagram illustrating a method for re-setting a reference point according to an embodiment.
Figure 9D:
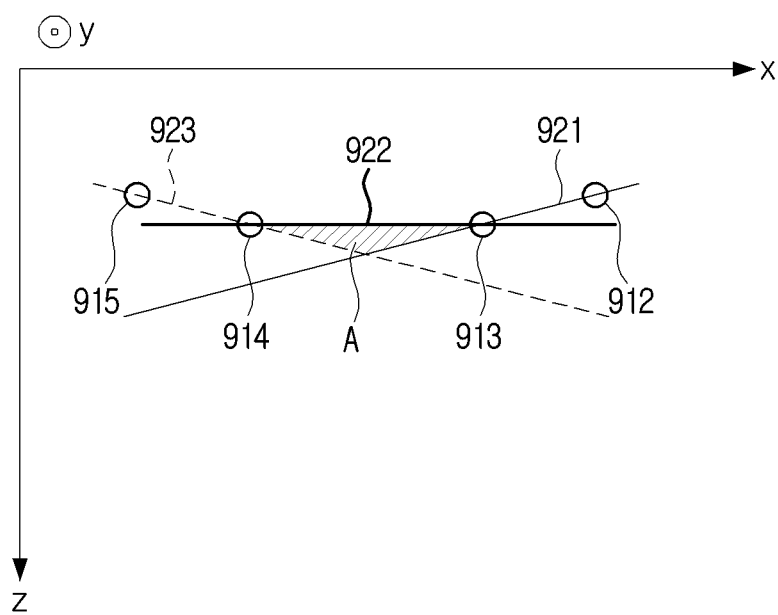
FIG. 9D is a diagram illustrating a method for re-setting a reference point according to an embodiment.

According to another embodiment, the predetermined pose may be set to the pose of the plurality of fingers such that the relative angle $\theta4$ or $\theta5$ between adjacent straight lines of the first to third straight lines 921 to 923, which are identified by the rest of the fingers except for the thumb, is greater than or equal to a predetermined value, as illustrated in FIG. 9C. For example, the predetermined pose may be a pose of a plurality of fingers that the relative angle $\theta5$ between the first straight line 921 and the second straight line 922 with reference to a first intersection 913 of the first straight line 921 and the second straight line 922 adjacent to each other is greater than or equal to a preset value (or less than a preset value), and that the relative angle θ4 between the second straight line 922 and a third straight line 923 with reference to a second cross point 914 of the second straight line 922 and a third straight line 923 is greater than or equal to a preset value (or less than a preset value).

According to another embodiment, the predetermined pose may be set to the pose of the plurality of fingers such that the width of the triangle A connecting the intersection of each of the first through third straight lines 921 to 923, which is identified by the rest of the fingers except for the thumb, is less than a predetermined value, as illustrated in FIG. 9B.

As described above, the reference point may be reset dynamically in a case where the pose of the finger is identified as corresponding to a preset pose, and when the position of the hand of a user is changed, a user's motion to input a specific key may be accurately recognized.

Figure 11:
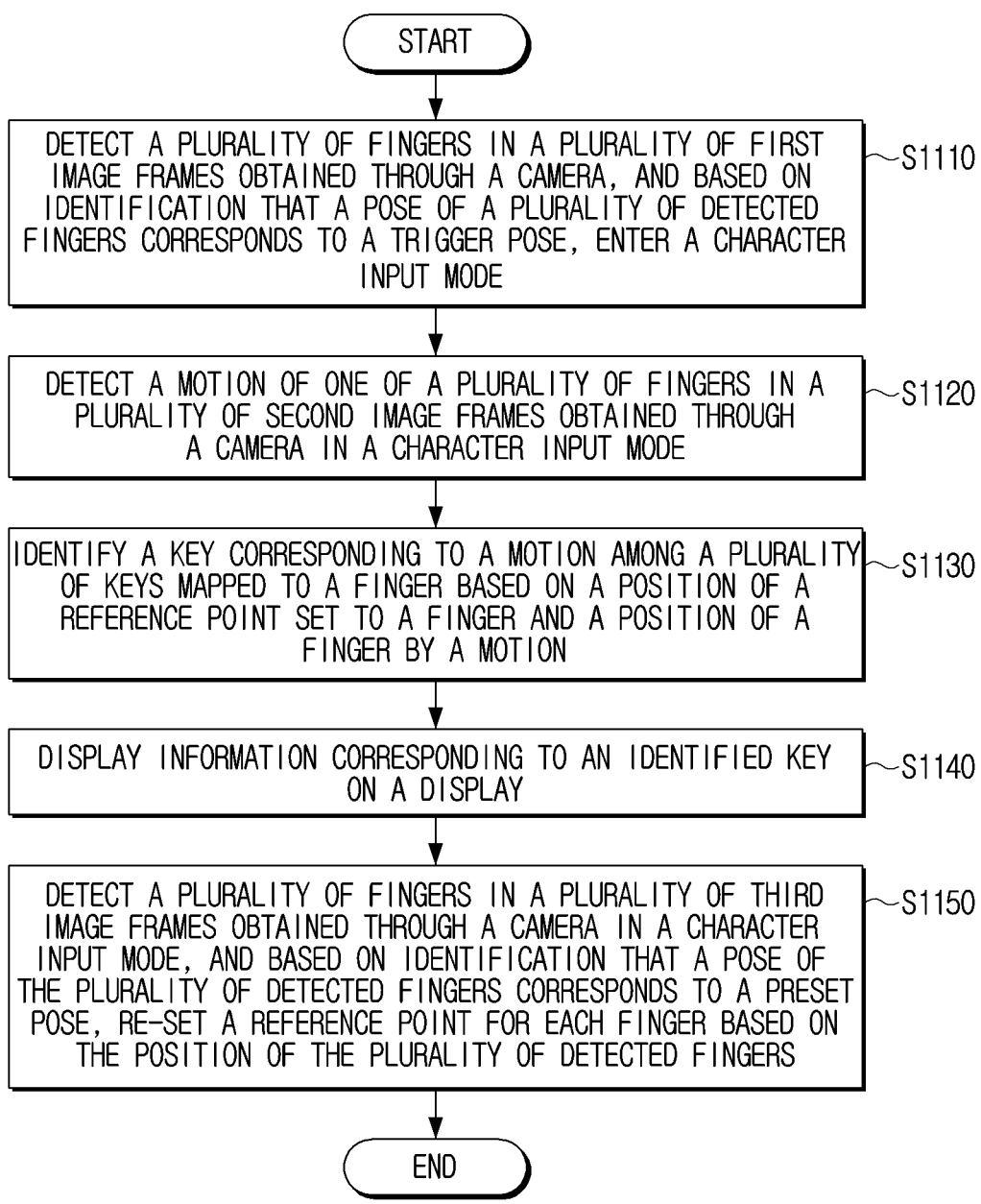
FIG. 11 is a flowchart illustrating a method for controlling an electronic apparatus according to an embodiment.

FIG. 11 is a flowchart illustrating a method for controlling an electronic apparatus 100 according to an embodiment.

Referring to FIG. 11, the controlling method of the electronic apparatus 100 may include detecting a plurality of fingers in a plurality of first image frames obtained through the camera 110, and based on a pose of the plurality of detected fingers being identified as corresponding to the trigger pose, entering a character input mode in operation S1110, detecting a motion of one of a plurality of fingers from a plurality of second image frames obtained through the camera S1120, identifying a key corresponding to a motion among a plurality of keys mapped to the finger based on the position of the finger by the motion and a reference point set to the finger in operation S1130, displaying the information corresponding to the identified key on the display 120 in operation S1140, and detecting a plurality of fingers in the plurality of third image frames obtained through the camera 110 in the character input mode and based on the pose of the plurality of detected fingers being identified as corresponding to a preset pose, resetting a reference point for each finger based on the position of the plurality of detected fingers in operation S1150.

The controlling method of the electronic apparatus 100 according to an embodiment may include detecting a plurality of fingers in a plurality of first image frames obtained through the camera 110, and based on a pose of the plurality of detected fingers being identified as corresponding to the trigger pose, entering a character input mode in operation S1110.

A motion of one of a plurality of fingers may be detected from a plurality of second image frames obtained through the camera 110 in operation S1120.

A key corresponding to a motion among a plurality of keys mapped to a finger may be identified based on a position of the finger by the motion and a position of a reference point set to the finger in operation S1130.

The plurality of keys may include the reference key determined based on the type of the hand including the finger and the type of the finger among the keys included in the virtual keyboard and at least two keys adjacent to the reference key.

If (or based on) the distance between the position of the finger by the motion and the position of the reference point set in the finger is less than a predetermined value, the user may identify the reference key among the plurality of keys mapped to the finger as a key corresponding to the motion, and if (or based on) the distance between the position of the finger by the motion and the position of the reference point set in the finger is equal to or greater than a predetermined value, the user may identify the key positioned in the direction in which the finger is moved from the reference key among the plurality of keys mapped to the finger based on the direction in which the finger is moved by the motion as a key corresponding to the motion.

The controlling method may further include detecting a plurality of fingers in a plurality of first image frames obtained through the camera 110, and if (or based on) the pose of the detected plurality of fingers is identified as corresponding to the trigger pose, setting a reference point for each finger based on the detected position of the plurality of fingers.

The setting operation may include displaying the virtual keyboard on the display 120 if the plurality of fingers detected in the plurality of first image frames are identified as corresponding to the trigger pose, and the displaying may include displaying the identified key among the keys included in the virtual keyboard to be distinguished from the other key once the key corresponding to the motion is identified.

The information corresponding to the identified key may be displayed on the display 120 in operation S1140.

The displaying operation may include deleting the information displayed on the display 120 when the key corresponding to the motion is a delete key for deleting the information displayed on the display 120, and adjusting the transparency of the virtual keyboard based on the frequency of deleting the information.

If the plurality of fingers are detected in the plurality of third image frames obtained through the camera 110 in the character input mode, and the pose of the detected plurality of fingers is identified as corresponding to a predetermined pose, the reference point for each finger may be reset based on the detected position of the plurality of fingers in operation S1150.

The resetting may include, when the plurality of detected fingers are identified as maintaining a preset pose for a predetermined time, resetting a reference point for each finger based on the position of the plurality of detected fingers.

The resetting may include identifying whether the pose of the detected plurality of fingers corresponds to a predetermined pose based on the position of the fingertip of the remaining finger except the thumb of the plurality of fingers detected in the plurality of third image frames.

If the motion of one finger among the plurality of fingers is detected in the plurality of fourth image frames obtained after the reference point is reset in the character input mode, a key corresponding to the motion among the plurality of keys mapped to the finger may be identified based on the position of the finger by the motion and the position of the reference point reset to the finger.

The controlling method may further include activating the camera 110 and obtaining a plurality of first image frames via the activated camera 110 when (or based on) a predetermined user command is input. The predetermined user command may include a user command to display the document to which the text input is possible or a user command to select a text input window displayed on the display 120.

Figure 12:
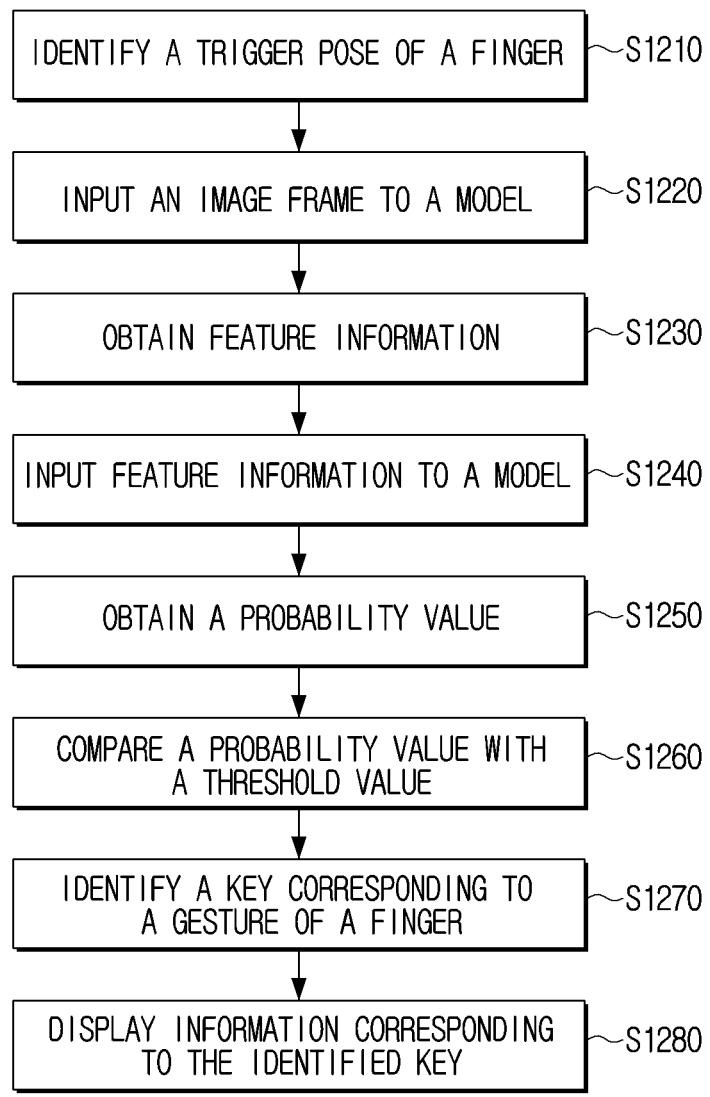
FIG. 12 is a flowchart illustrating a method for identifying a key corresponding to a motion according to an embodiment.

FIG. 12 is a flowchart illustrating a method for identifying a key corresponding to a motion according to an embodiment.

Referring to FIG. 12, the processor 140 may detect a plurality of fingers in the plurality of first image frames obtained before the plurality of the second image frames and may identify (or determine) whether a pose of the detected plurality of fingers may correspond to the trigger pose in operation S1210.

The plurality of second image frames may include an image frame of a first state (e.g., a state in which all of the plurality of fingers are spaced for greater than or equal to a predetermined distance in a particular plane) and a second state (e.g., a state in which at least one of the plurality of fingers is placed on a particular plane or a contacted state) after the image frame of the first state. For example, the plurality of second image frames may include an image frame in the first state, such as FIG. 5A(a), and an image frame in a second state, such as FIG. 5A(b), as described above with reference to operation S320 of FIG. 3.

The processor 140 may input a plurality of second image frames obtained after the first plurality of image frames to a first artificial intelligence (AI) model, if the pose of the plurality of fingers detected in the plurality of first image frames is identified (or determined) as corresponding to the trigger pose in operation S1220. When the processor 140 inputs the plurality of second image frames to the first AI model, the processor 140 may obtain the keypoint information as the output of the first AI model in operation S1230.

The first AI model may be an AI model trained to obtain keypoint information from an image frame and may be stored in the memory 130. The keypoint information may include position information of each of the plurality of keypoints.

A function related to the AI may operate through the processor 140 and the memory 130. The processor 140 controls the processing of the input data according to a predefined operating rule or an AI model stored in the memory 130. The predefined operating rule or AI model is made or updated through learning. Here, being made through learning may indicate that a predetermined operating rule or an AI model with a desired feature is made by applying a training or learning algorithm to a plurality of training or learning data. The learning may be performed in a device itself in which AI according to an embodiment is performed, and may be implemented through a separate device or server/system.

The AI model may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks. It is understood that the neural network according to various embodiments is not limited to the above-described example, unless specified otherwise.

The learning algorithm is a method for training a predetermined target device (e.g., a user interface device) using a plurality of learning data to cause the predetermined target device to make a determination or prediction by itself. Examples of learning algorithms include supervised learning, unsupervised learning, semi-supervised learning, or reinforcement learning, and the learning algorithm in the disclosure is not limited to the examples described above except when specified.

In this case, the processor 140 may input the feature information to the second AI model in operation S1240. When the processor 140 inputs the feature information to the second AI model, the processor 140 may obtain the probability value as the output of the second AI model in operation S1250. The second AI model may be an AI model trained to obtain a probability value for each of a plurality of keys included in a virtual keyboard in the feature information, and may be stored in the memory 130. The description of the AI model or the learning algorithm may be applied in the same manner.

While the first and second AI models have been described above as being stored in the memory 130 of the electronic apparatus 100, at least one of the first and second AI models may be stored in an external device (e.g., a server or the like).

According to an embodiment, the processor 140 may control the communicator 170 to transmit a plurality of image frames obtained through the camera 110 to an external device. In this example, the external device may input a plurality of image frames received from the electronic apparatus 100 to the first AI model, input the output of the first AI model (e.g., feature information) into the second AI model, and transmit an output (e.g., a probability value) of the second AI model to the electronic apparatus 100. In this case, the electronic apparatus 100 may receive an output (e.g., a probability value) of the second AI model from the external device via the communicator 170.

According to another embodiment, the processor 140 may receive the first and second AI models from the external device via the communicator 170, input the plurality of image frames obtained through the camera 110 to the first AI model, and input the output (e.g., feature information) of the first AI model into the second AI model to obtain an output (e.g., a probability value) of the second AI model. The first and second AI models may be trained, and the processor 140 may then update the first and second AI models stored in the external device by controlling the communicator 170 to transmit the trained first and second AI models back to the external device.

The processor 140 may compare the probability value for each of the plurality of keys with a threshold value in operation S1260, and determine (or identify) a key corresponding to the probability value having a threshold value or more among the probability values for each of the plurality of keys as a key corresponding to the motion (or gesture) of the finger in operation S1270. If the probability value having a threshold value or more is plural, the processor 140 may determine (identify) a key having the largest probability value as a key corresponding to the motion of the finger.

For example, if it is assumed that the threshold value is 0.7, the probability value for the S key is 0.9 and the probability value for the W key is 0.5, the processor 140 may determine the S key having a threshold value or more among the probability values for each of the S key and the W key as a key corresponding to the motion of the finger.

The processor 140 may control the display 120 to display information corresponding to the determined (or identified) key in operation S1280.

While operations S1220 to S1230 of FIG. 12 have been described as obtaining feature information by inputting an image frame to a first AI model, it is understood that one or more other embodiments are not limited thereto. For example, according to another embodiment, it is also possible to obtain feature information including a plurality of keypoints through a programming library (e.g., OpenCV, Python, etc.) or various algorithms for analyzing the real-time computer vision described above.

Figure 13A:
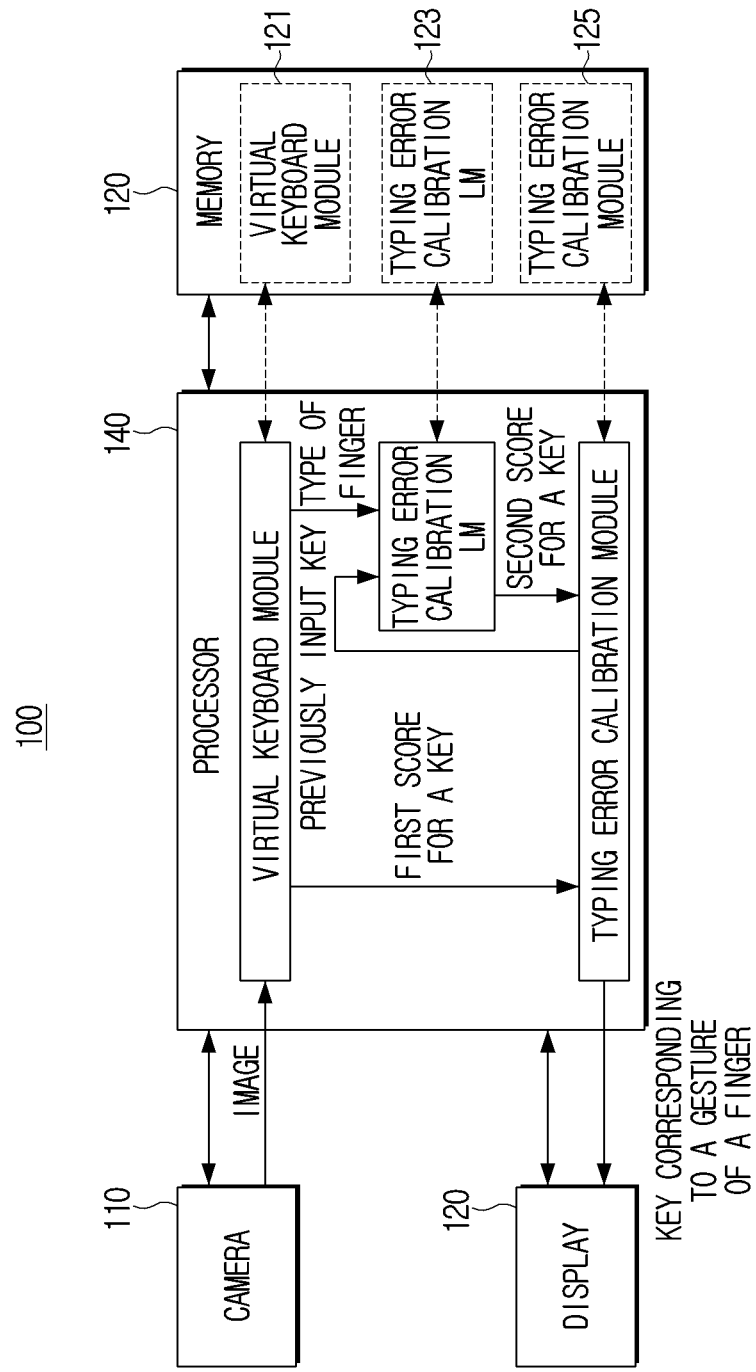
FIG. 13A is a diagram illustrating a method for calibrating a typing error by an electronic apparatus according to an embodiment.

FIGS. 13A and 13B are diagrams illustrating a method for calibrating a typing error by an electronic apparatus 100 according to an embodiment.

Referring to FIGS. 13A and 13B, the electronic apparatus 100 may correct an error. FIG. 13A illustrates a state in which each module and model is loaded (or executed) by the processor 140 and operated in the processor 140, and the module and model may be stored in the memory 130. Hereinafter, the electronic apparatus 100 is in a state of entering a character input mode, and will be described by assuming that a trigger pose of a finger is identified in the image frame.

The processor 140 may obtain a plurality of image frames through the camera in operation S1310.

The processor 140 may detect a coordinate (or position) of each of a plurality of fingers from a plurality of image frames obtained by the camera 110 through the virtual keyboard module 121 in operation S1320.

The processor 140 may detect the type of the finger and the coordinates of the finger using the keypoint of the hand of the user. In this example, the coordinate (or position) of each finger may include a coordinate (or position) for a point corresponding to the fingertip of each finger or at least one joint of each finger.

The processor 140 may determine a first score for each of the plurality of keys mapped to each finger based on a change in coordinates of a finger included in the plurality of image frames (a change in the position of the keypoint) in operation S1330. For example, the processor 140 may determine a movement distance and a direction of movement of the finger according to a change in the coordinates of each finger (position change of the keypoint), and determine a first score for each of the plurality of keys mapped to the finger according to the movement distance and the direction of movement of each finger. The first score for the key (e.g., the first score for the A key) indicates the possibility that the key corresponding to the motion (or gesture) of the finger (or a key recognized as an input according to the motion of the finger) is the corresponding key (e.g., A key). For example, the first score may be a numerical value or a probability that the numerical value is normalized, or the like.

The processor 140 may determine a first score for each of the plurality of keys mapped to the finger using the above-described reference point or an AI model.

If the reference point is used, the processor 140 may calculate the direction and size of the vector of the keypoint of the finger of which motion is detected by the reference point, and calculate a first score for each of the plurality of keys mapped to the finger of which motion is detected in the reference key. Here, the point of time of the vector corresponds to the reference key, and the endpoint of the vector may correspond to at least one of the plurality of keys mapped to the finger.

When using the AI model, the processor 140 may input the image frame obtained through the camera 110 to the first AI model and obtain feature information (such as location information of the 1) as the output of the first AI model. The processor 140 may input the feature information to the second AI model and obtain a first score as an output of the second AI model. Here, the first AI model may be an AI model trained to obtain feature information in an image frame, and the second AI model may be an AI model trained to obtain a first score (probability value) for each of a plurality of keys included in a virtual keyboard in the feature information.

The processor 140 may determine that the larger the first score (e.g., first score for the A key) for a key, the higher the possibility to type the corresponding key (e.g., A key).

In operation S1340, the processor 140 may compare the first score with the threshold value as shown in FIG. 13B in operation S1340, compare as if the key with the highest first score is a preset key in operation S1350, and use the first score or the second score according to the comparison result to determine a key corresponding to the gesture of the finger. However, it is understood that this is only an embodiment, and the order of operations S1340 and S1350 may be changed or one of operations S1340 and S1350 may be omitted.

The processor 140 may compare the highest (largest) first score among the first scores for each key with a threshold value through the typing error calibration module in operation S1340. The threshold value may be set to, for example, 70%.

Here, if it is determined that the highest first score among the first scores for each of the plurality of keys is greater than or equal to the threshold value through the error calibration module in operation S1340—N, the processor 140 may determine whether the key having the highest score corresponds to the predetermined key in operation S1350.

Here, the predetermined key is a key having a high typing error rate, and the predetermined key may be set or changed by a manufacturer or the user. Specifically, if a server of a manufacturer (or third party) collects an occurrence frequency of a typing error of each of a plurality of users using a plurality of electronic apparatuses 100 from a plurality of electronic apparatuses 100, and transmits information on a key having a higher ranking according to the generated frequency of the typing error generated in the server to the electronic apparatus 100, the electronic apparatus 100 may set the higher-ranked key as a predetermined key. For example, at least one of the V key and the B key may be set to a predetermined key when the frequency between the V key and the B key input by the user through the left hand index finger is high.

If the processor 140 determines that the key having the highest first score is not the preset key in operation S1350—N, the processor 140 may determine (or identify) the key having the highest first score as the key corresponding to the gesture of the finger in operation S1380. The processor 140 may then control the display 120 to display information corresponding to the identified key.

In the case that the key determined by the processor 140 is different from the key intended by the user (that is, the probability that the key determined by the processor 140 is a typing error), the processor 140 may consider the key determined by the processor 140 as a key input by the user.

If the processor 140 determines that the highest first score among the first scores for each of the plurality of keys is lower than the threshold value in operation S1340—N, or determines that the key having the highest first score is a preset key in operation S1350—Y, the processor 140 may determine a second score for each of the plurality of keys based on the type of the finger mapped to the key through the typing error calibration language model (LM) and a key previously input in operation S1360, The processor 140 may input the type of finger mapped to the key and the previously input key to the typing error calibration LM to obtain a second score for each of the plurality of keys as an output of the tying error calibration LM.

Here, the typing error calibration LM may be a model that assigns a probability to a sequence such as a character, a word, a sentence, a paragraph, etc. That is, the typing error calibration LM may be a model that is trained to predict the next character (or currently entered key) using a word, grammar, context, big data, etc., given the previous character or the like.

The second score for the key (e.g., the second score for the A key) indicates the possibility that the key corresponding to the motion (or gesture) of the finger (the key recognized as the input according to the motion of the finger) is the corresponding key (e.g., A key). For example, the second score may be a numerical value or a probability that the numerical value is normalized, or the like.

Afterwards, the processor 140 may determine (or identify) a key corresponding to the gesture of the finger, using a second score for the key received in the typing error calibration LM, through the typing error calibration module in operation S1370. For example, the processor 140 may determine that the second score is the key that corresponds to the gesture of the finger. The processor 140 may then control the display 120 to display information corresponding to the identified key.

This is the case where the key determined by the processor 140 is different from the key intended by the user, that is, the probability of a typing error is high. In this example, a user may correct a typing key in consideration of a context such as a character, a word, a sentence unit, etc., inputted according to a typing key. In this example, some keys mapped to the type of a finger other than the full keys of the keyboard may be selected as a candidate target so that the user may correct the typing key more accurately.

The electronic apparatus 100 according to an embodiment may provide an interface accurately identifying a user's motion as an input of a key intended by a user.

According to various embodiments, an electronic apparatus 100 capable of providing an interface capable of recognizing a user's motion as an input and a method for controlling thereof may be provided.

According to various embodiments, provided are an electronic apparatus and a method for controlling thereof to improve a recognition rate for a user to recognize a motion of a user as a desired input, and to provide an interface environment for improving convenience and rapidity of input.

Various embodiments may be implemented as software that includes instructions stored in machine-readable storage media readable by a machine (e.g., a computer). A device may call instructions from a storage medium and operate in accordance with the called instructions, including an electronic apparatus (e.g., the electronic apparatus 1000). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

What is claimed is:

1. An electronic apparatus comprising:
a camera;
a display;
a memory configured to store at least one instruction; and
a processor configured to execute the at least one instruction to:
detect a plurality of fingers in a plurality of first image frames obtained through the camera, obtain depth information regarding the plurality of detected fingers through the camera, identify a plurality of feature points corresponding to respective fingers in a predetermined three-dimensional coordinate space based on the depth information regarding the plurality of detected fingers,
identify whether a pose of the plurality of detected fingers corresponds to a trigger pose which is set as a pose in which at least one finger of the plurality of fingers are apart by a preset distance from a first plane of the predetermined three-dimensional coordinate space, based on the identified the plurality of feature points corresponding to respectively fingers,
in response to an identification that the pose of the plurality of detected fingers corresponds to the trigger pose, set one of the plurality of feature points as a reference point corresponding to a respective finger, and enter a character input mode,
detect a first motion of a finger among the plurality of fingers in a plurality of second image frames obtained through the camera in the character input mode,
identify a distance between a position of the finger by the first motion and a position of the reference point set to the finger in the predetermined three-dimensional coordinate space,
identify a key corresponding to the first motion, from among a plurality of keys mapped to the finger according to a predetermined mapping between the plurality of keys and the finger, based on the identified distance, the position of the finger by the first motion and the reference point set to the finger,
control the display to display information corresponding to the identified key, and
detect the plurality of fingers in a plurality of third image frames obtained through the camera in the character input mode and, in response to an identification that the pose of the plurality of detected fingers in the plurality of third image frames corresponds to a predetermined pose, re-set a reference point for respective fingers based on a position of the plurality of detected fingers in the plurality of third image frames,
wherein the plurality of keys mapped to the finger comprises a reference key, determined based on a type of a hand including the finger and a type of the finger, among keys included in a virtual keyboard and at least two keys adjacent to the reference key among the keys included in the virtual keyboard, wherein the processor is further configured to execute the at least one instruction to:

identify the reference key by mapping the reference key to a position of the reference point corresponding to the each finger in the predetermined three-dimensional coordinate space, based on the identified distance being less than a predetermined value, identify a reference key, among the plurality of keys mapped to the finger, as the key corresponding to the first motion, and based on the identified distance being greater than or equal to the predetermined value, identify a key positioned in a direction in which the finger moves from the reference key, from among the plurality of keys mapped to the finger, as the key corresponding to the first motion based on a moving direction of the finger by the first motion, wherein the processor is further configured to execute the at least one instruction to, in response to the identification that the pose of the plurality of fingers, in the predetermined three-dimensional coordinate space distinct from the display, detected in the plurality of first image frames corresponds to the trigger pose, control to display a virtual keyboard on the display.

2. The electronic apparatus of claim 1, wherein the processor is further configured to execute the at least one instruction to, in response to an identification that the plurality of fingers detected in the plurality of third image frames maintain the predetermined pose for a predetermined time, re-set the reference point for the respective fingers based on the position of the plurality of detected fingers in the plurality of third image frames.

3. The electronic apparatus of claim 1, wherein the processor is further configured to execute the at least one instruction to identify whether the pose of the plurality of detected fingers in the plurality of third image frames corresponds to the predetermined pose based on a position of a fingertip of a remaining finger other than a thumb among the plurality of fingers detected in the plurality of third image frames.

4. The electronic apparatus of claim 1, wherein the processor is further configured to execute the at least one instruction to, based on a second motion of the finger among the plurality of fingers being detected in a plurality of fourth image frames obtained through the camera after the reference point is re-set in the character input mode, identify a key corresponding to the second motion, from among the plurality keys mapped to the finger, based on a position of the finger by the second motion and a position of a reference point reset to the finger.

5. The electronic apparatus of claim 1, wherein the processor is further configured to execute the at least one instruction to, in response to the identification that the pose of the plurality of fingers detected in the plurality of first image frames corresponds to the trigger pose, set the reference point for the finger based on a position of the plurality of detected fingers in the plurality of first image frames.

6. The electronic apparatus of claim 5, wherein the processor is further configured to execute the at least one instruction to, in response to the identification that the pose of the plurality of fingers detected in the plurality of first image frames corresponds to the trigger pose:

based on the key corresponding to the first motion being identified in the character input mode, control to display the identified key among keys included in the virtual keyboard to be distinguished from another key.

7. The electronic apparatus of claim 6, wherein the processor is further configured to execute the at least one instruction to:

based on the key corresponding to the first motion being a deletion key to delete information displayed on the display, delete the information displayed on the display and adjust a transparency of the virtual keyboard based on a frequency of deleting the information.

8. The electronic apparatus of claim 5, wherein:

the processor is further configured to execute the at least one instruction to, based on a preset user command being input, activate the camera and obtain the plurality of first image frames through the activated camera; and the preset user command comprises a user command to display a document capable of text input to the display or a user command to select a text input window displayed on the display.

9. A method of controlling an electronic apparatus, the method comprising:

detecting a plurality of fingers in a plurality of first image frames obtained through a camera;

obtaining depth information regarding the plurality of detected fingers through the camera;

identifying a plurality of feature points corresponding to respective fingers in a predetermined three-dimensional coordinate space based on the depth information regarding the plurality of detected fingers;

identifying whether a pose of the plurality of detected fingers corresponds to a trigger pose which is set as a pose in which at least one finger of the plurality of fingers are apart by a preset distance from a first plane of the predetermined three-dimensional coordinate space, based on the identified the plurality of feature points corresponding to respectively finger;

in response to an identification that a pose of the plurality of detected fingers corresponds to a trigger pose, setting one of the plurality of feature points as a reference point corresponding to a respective finger, and entering a character input mode;

detecting a first motion of a finger among the plurality of fingers in a plurality of second image frames obtained through the camera in the character input mode;

identifying a distance between a position of the finger by the first motion and a position of the reference point set to the finger in the predetermined three-dimensional coordinate space;

identifying a key corresponding to the first motion, from among a plurality of keys mapped to the finger according to a predetermined mapping between the plurality of keys and the finger, based on the identified distance, the position of the finger by the first motion and the reference point set to the finger;

displaying information corresponding to the identified key on a display; and detecting the plurality of fingers in a plurality of third image frames obtained through the camera in the character input mode and, in response to an identification that the pose of the plurality of detected fingers corresponds to a predetermined pose, re-setting a reference point for respective fingers based on a position of the plurality of detected fingers in the plurality of third image frames, wherein the plurality of keys mapped to the finger comprises a reference key, determined based on a type of a hand including the finger and a type of the finger, among keys included in a virtual keyboard and at least two keys adjacent to the reference key among the keys included in the virtual keyboard, wherein the identifying the key comprises:
identifying the reference key by mapping the reference key to a position of the reference point corresponding to the each finger in the predetermined three-dimensional coordinate space, and based on the identified distance being less than a predetermined value, identifying a reference key, among the plurality of keys mapped to the finger, as the key corresponding to the first motion, and based on the identified distance being greater than or equal to the predetermined value, identifying a key positioned in a direction in which the finger moves from the reference key, from among the plurality of keys mapped to the finger, as the key corresponding to the first motion based on a moving direction of the finger by the first motion, wherein the method further comprises, in response to the identification that the pose of the plurality of fingers, in the predetermined three-dimensional coordinate space distinct from the display, detected in the plurality of first image frames corresponds to the trigger pose, control to display a virtual keyboard on the display.

10. The method of claim 9, wherein the re-setting comprises, in response to an identification that the plurality of fingers detected in the plurality of third image frames maintain the predetermined pose for a predetermined time, re-setting the reference point for the respective fingers based on the position of the plurality of detected fingers in the plurality of third image frames.

11. The method of claim 9, wherein the re-setting comprises identifying whether the pose of the plurality of detected fingers in the plurality of third image frames corresponds to the predetermined pose based on a position of a fingertip of a remaining finger other than a thumb among the plurality of fingers detected in the plurality of third image frames.

12. The method of claim 9, wherein the re-setting comprises based on a second motion of the finger among the plurality of fingers being detected in a plurality of fourth image frames obtained through the camera after the reference point is re-set in the character input mode, identifying a key corresponding to the second motion, from among the plurality keys mapped to the finger, based on a position of the finger by the second motion and a position of a reference point reset to the finger.

13. The method of claim 9, further comprising:
in response to the identification that the pose of the plurality of fingers detected in the plurality of first image frames corresponds to the trigger pose, setting the reference point for the finger based on a position of the plurality of detected fingers in the plurality of first image frames.

14. The method of claim 13, wherein:
the displaying the virtual keyboard comprises, based on the key corresponding to the first motion being identified in the character input mode, displaying the identified key among keys included in the virtual keyboard to be distinguished from another key.

15. The method of claim 14, wherein the displaying the virtual keyboard further comprises:
based on the key corresponding to the first motion being a deletion key to delete information displayed on the display, deleting the information displayed on the display and adjusting a transparency of the virtual keyboard based on a frequency of deleting the information.

16. The method of claim 13, further comprising:
based on a preset user command being input, activating the camera and obtaining the plurality of first image frames through the activated camera,
wherein the preset user command comprises a user command to display a document capable of text input to the display or a user command to select a text input window displayed on the display.

* * * * *